(12) United States Patent
Yanagihara et al.

(10) Patent No.: US 11,447,694 B2
(45) Date of Patent: *Sep. 20, 2022

(54) METHOD FOR MANUFACTURING WAVELENGTH CONVERSION MEMBER

(71) Applicant: NICHIA CORPORATION, Anan (JP)

(72) Inventors: Tadayoshi Yanagihara, Tokushima (JP); Naoto Fujioka, Tokushima (JP); Keisuke Suzuki, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,763

(22) Filed: Feb. 4, 2021

(65) Prior Publication Data
US 2021/0179932 A1    Jun. 17, 2021

Related U.S. Application Data

(63) Continuation of application No. 15/906,612, filed on Feb. 27, 2018, now Pat. No. 10,947,448.

(30) Foreign Application Priority Data

Feb. 28, 2017 (JP) .............................. JP2017-036175
Apr. 27, 2017 (JP) .............................. JP2017-088292
Dec. 5, 2017 (JP) .............................. JP2017-233159

(51) Int. Cl.
C09K 11/02       (2006.01)
C04B 35/117      (2006.01)
(Continued)

(52) U.S. Cl.
CPC .......... *C09K 11/025* (2013.01); *C04B 35/117* (2013.01); *C04B 35/44* (2013.01);
(Continued)

(58) Field of Classification Search
CPC . C09K 11/025; C09K 11/7774; C04B 35/117; C04B 35/44; C04B 35/6466;
(Continued)

(56) References Cited

U.S. PATENT DOCUMENTS 4,364,162 A * 12/1982 Nilsson ................. B22F 3/1258
29/DIG. 31
4,612,162 A * 9/1986 Morgan .................... B22F 3/15
419/23
(Continued)

FOREIGN PATENT DOCUMENTS

CN       104291796       *   1/2015
CN       104291796 A        1/2015
(Continued)

*Primary Examiner* — C Melissa Koslow
(74) *Attorney, Agent, or Firm* — Hunton Andrews Kurth LLP

(57) ABSTRACT

A method for manufacturing a wavelength conversion member that offers a high emission intensity and a high light conversion efficiency is provided. The method for manufacturing a wavelength conversion member includes providing a green body containing an yttrium-aluminum-garnet phosphor with a composition represented by Formula (I) below and alumina particles with an alumina purity of 99.0% by mass or more, primary-sintering the green body to obtain a first sintered body, and secondary-sintering the first sintered body by applying a hot isostatic pressing (HIP) treatment to obtain a second sintered body.

$$(Y_{1-a-b}Gd_aCe_b)_3Al_5O_{12} \qquad (I)$$

wherein a and b satisfy $0 \le a \le 0.3$ and $0 \le b \le 0.022$.

19 Claims, 11 Drawing Sheets

(51) Int. Cl.
*C04B 35/645* (2006.01)
*F21V 9/30* (2018.01)
*C09K 11/77* (2006.01)
*C04B 35/44* (2006.01)
*C04B 35/626* (2006.01)

(52) U.S. Cl.
CPC .... *C04B 35/6265* (2013.01); *C04B 35/62685* (2013.01); *C04B 35/6455* (2013.01); *C09K 11/7774* (2013.01); *F21V 9/30* (2018.02); C04B 2235/3215 (2013.01); C04B 2235/3217 (2013.01); C04B 2235/3222 (2013.01); C04B 2235/3224 (2013.01); C04B 2235/3225 (2013.01); C04B 2235/3229 (2013.01); C04B 2235/445 (2013.01); C04B 2235/5436 (2013.01); C04B 2235/5445 (2013.01); C04B 2235/604 (2013.01); C04B 2235/656 (2013.01); C04B 2235/6583 (2013.01); C04B 2235/661 (2013.01); C04B 2235/663 (2013.01); C04B 2235/664 (2013.01); C04B 2235/764 (2013.01); C04B 2235/77 (2013.01)

(58) Field of Classification Search
CPC .... C04B 2235/3217; C04B 2235/3222; C04B 2235/445; C04B 2235/3418; C04B 2235/3279; C04B 2235/3251; C04B 2235/3232; C04B 2235/604; C04B 2235/662; C04B 2235/602; C04B 2235/3206; C04B 2235/3225; C04B 2235/77; C04B 2235/6583; C04B 2235/5445; C04B 2235/5436
See application file for complete search history.

(56) References Cited

U.S. PATENT DOCUMENTS

| | | | |
|---|---|---|---|
| 4,612,163 A * | 9/1986 | Nishio | B22F 3/04 419/68 |
| 4,861,546 A * | 8/1989 | Friedman | B22F 3/1258 419/8 |
| 7,879,258 B2 * | 2/2011 | De Graaf | C04B 35/6261 252/301.4 R |
| 8,137,587 B2 | 3/2012 | Miyagawa et al. | |
| 8,339,025 B2 | 12/2012 | Nakamura et al. | |
| 8,496,852 B2 | 7/2013 | De Graaf et al. | |
| 9,604,853 B2 * | 3/2017 | Ikari | C04B 35/6455 |
| 10,947,448 B2 * | 3/2021 | Yanagihara | C04B 35/117 |
| 2008/0187746 A1 | 8/2008 | De Graaf et al. | |
| 2010/0301793 A1 | 12/2010 | Jahkonen et al. | |
| 2011/0181173 A1 | 7/2011 | De Graaf et al. | |
| 2015/0329777 A1 * | 11/2015 | Hoppe | C04B 35/117 428/220 |
| 2015/0329778 A1 | 11/2015 | Menke et al. | |
| 2017/0234993 A1 * | 8/2017 | Fujiwara | B28B 1/30 264/21 |
| 2017/0315433 A1 | 11/2017 | Ronda et al. | |
| 2018/0244986 A1 | 8/2018 | Yanagihara et al. | |

FOREIGN PATENT DOCUMENTS

| | | |
|---|---|---|
| CN | 107540368 A | 1/2018 |
| JP | 2008533270 A | 8/2008 |
| JP | 2009096653 A | 5/2009 |
| JP | 2010235388 A | 10/2010 |
| JP | 2012528920 A | 11/2012 |
| JP | 2014234487 A | 12/2014 |
| JP | 2015137283 A | 7/2015 |
| JP | 2016084376 A | 5/2016 |
| JP | 2016160160 A | 9/2016 |
| JP | 2016204561 A | 12/2016 |
| JP | WO2016021346 A1 | 7/2017 |
| WO | 2016075014 A1 | 5/2016 |

* cited by examiner

METHOD FOR MANUFACTURING WAVELENGTH CONVERSION MEMBER

CROSS-REFERENCE TO RELATED PATENT APPLICATION

This is a continuation application of U.S. patent application Ser. No. 15/906,612, filed Feb. 27, 2018, now U.S. Pat. No. 10,947,448, which claims priority to Japanese Patent Application No. 2017-036175, filed on Feb. 28, 2017, Japanese Patent Application No. 2017-088292, filed on Apr. 27, 2017, and Japanese Patent Application No. 2017-233159, filed on Dec. 5, 2017, the entire disclosures of which are incorporated herein by references in their entirety.

BACKGROUND

Technical Field

The present invention relates to a method for manufacturing a wavelength conversion member that converts the wavelengths of light emitted from light-emitting diodes (hereinafter also referred to as "LEDs") and laser diodes (hereinafter also referred to as "LDs").

Description of Related Art

Light-emitting devices employing LEDs as light-emitting elements are used as an alternative to light sources such as incandescent lamps and fluorescent lamps because such light-emitting devices are long-lasting light sources having high conversion efficiencies, consuming less power, and capable of being miniaturized. The light-emitting devices employing LEDs are used not only in the field of illumination, such as interior illumination and illumination for vehicles, but also in broad fields of backlights for liquid crystal displays, decorative lighting, and the like. In particular, light-emitting devices that emit mixed light generated by the combination of blue light-emitting elements and yellow phosphors are superior in the cost and quality and are thus widely used.

Known phosphors used for light-emitting devices include rare-earth aluminate phosphors represented by $(Y,Gd,Tb,Lu)_3(Al,Ga)_5O_{12}:Ce$, silicate phosphors represented by $(Sr,Ca,Ba)_2SiO_4:Eu$, and Ca-α-SiAlON phosphors.

As a wavelength conversion member, for example, a wavelength conversion member is disclosed that is made of a sintered body made by mixing a glass powder with an inorganic phosphor powder, melting the glass powder, and solidifying the product (Japanese Unexamined Patent Application Publication No. 2014-234487).

However, in the wavelength conversion member disclosed in Japanese Unexamined Patent Application Publication No. 2014-234487, the glass component may be mixed into the inorganic phosphor during formation of the sintered body and may cause remarkable decrease in light conversion efficiency. Also, in the case where glass is used, it is difficult to obtain a high-density sintered body, and holes present inside the sintered body reduce the light conversion efficiency in the case where the sintered body is used in a light-emitting device.

Accordingly, an embodiment of the present invention has an object to provide a method for manufacturing a wavelength conversion member that offers a high emission intensity and a high light conversion efficiency.

SUMMARY OF THE INVENTION

Means for solving the above problems includes the following embodiments.

A first embodiment of the present invention is a method for manufacturing a wavelength conversion member, the method including
providing a green body containing
an yttrium-aluminum-garnet phosphor with a composition represented by Formula (I) below; and
alumina particles with an alumina purity of 99.0% by mass or more;
primary-sintering the green body to obtain a first sintered body; and
secondary-sintering the first sintered body by applying a hot isostatic pressing (HIP) treatment to obtain a second sintered body.

$$(Y_{1-a-b}Gd_aCe_b)_3Al_5O_{12} \tag{I}$$

wherein a and b satisfy $0 \le a \le 0.3$ and $0 \le b \le 0.022$.

A second embodiment of the present disclosure is a method for manufacturing a wavelength conversion member, the method including providing a green body containing an yttrium-aluminum-garnet phosphor and alumina particles with an alumina purity of 99.0% by mass or more, primary-sintering the green body to obtain a first sintered body, secondary-sintering the first sintered body by applying a hot isostatic pressing (HIP) treatment to obtain a second sintered body, and annealing the second sintered body in an oxygen-containing atmosphere.

An embodiment of the present disclosure provides a method for manufacturing a wavelength conversion member that offers a high emission intensity and a high light conversion efficiency.

DETAILED DESCRIPTION

Figure 1:
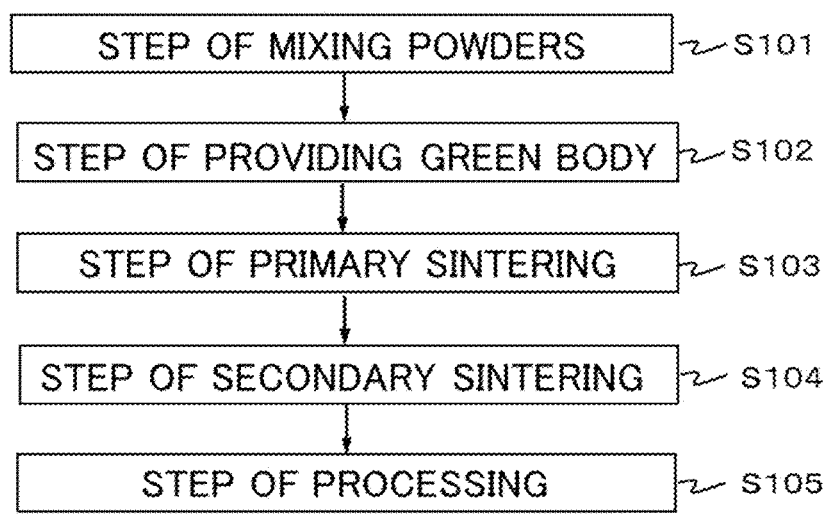
FIG. 1 is a flowchart showing the order of steps in a method for manufacturing a wavelength conversion member in a first embodiment of the present disclosure.

A method for manufacturing a wavelength conversion member according to the present invention will be described below on the basis of embodiments. The embodiments below are examples intended to embody the technical concept of the present invention and do not limit the present invention to the methods for manufacturing a wavelength conversion member below. Standards according to JIS Z8110 are applied to the relations between color names and chromaticity coordinates, the relations between wavelength ranges of light and color names of monochromatic lights.

Method for Manufacturing Wavelength Conversion Member According to First Embodiment A method for manufacturing a wavelength conversion member according to a first embodiment includes providing a green body containing an yttrium-aluminum-garnet phosphor with a composition represented by Formula (I) below and alumina particles with an alumina purity of 99.0% by mass or more, primary-sintering the green body to obtain a first sintered body, and secondary-sintering the first sintered body by applying the hot isostatic pressing (HIP) treatment to obtain a second sintered body.

Hereinafter, the yttrium-aluminum-garnet phosphor may also be referred to as the "YAG phosphor".

$(Y_{1-a-b}Gd_aCe_b)_3Al_5O_{12}$     (I)

wherein a and b satisfy $0 \le a \le 0.3$ and $0 \le b \le 0.022$.

In the phosphor with the composition represented by Formula (I), the variable a is the activation amount of Gd. The variable a is in a range of 0 to 0.3 ($0 \le a \le 0.3$), preferably 0.01 to 0.28 ($0.01 \le a \le 0.28$), more preferably 0.02 to 0.27 ($0.02 \le b \le 0.27$), further preferably 0.03 to 0.25 ($0.03 \le a \le 0.25$), even more preferably 0.05 to 0.25 ($0.05 \le a \le 0.25$). In the phosphor with the composition represented by Formula (I), Gd may be absent in the crystal structure. In the phosphor with the composition represented by Formula (I), if the variable a, which is the activation amount of Gd, exceeds 0.3, the emission peak wavelength of the phosphor may shift, thereby preventing a desired light conversion efficiency from being obtained.

In the YAG phosphor with the composition represented by Formula (I), the variable b is the activation amount of Ce. The variable b is in a range from over 0 to 0.022 ($0 \le b \le 0.022$), preferably in a range of 0.0001 to 0.020 ($0.0001 \le b \le 0.02$), more preferably 0.0002 to 0.015 ($0.0002 \le b \le 0.015$), further preferably 0.0002 to 0.012 ($0.0002 \le b \le 0.012$), even more preferably 0.0003 to 0.012 ($0.0003 \le b \le 0.012$). In the phosphor with the composition represented by Formula (I), if the value of the variable b, which is the activation amount of Ce, is 0, no element in the crystal structure serves as the luminescence center, and light is not emitted. If the value of the variable b exceeds 0.022, the emission intensity tends to decrease due to concentration quenching, and a desired light conversion efficiency is not obtained.

The average particle size of the YAG phosphor particles is preferably in a range of 1 µm to 50 µm, more preferably 1 µm to 40 µm, further preferably 2 µm to 40 µm, even more preferably 2 µm to 20 µm, particularly preferably 2 µm to 15 µm. If the average particle size of the YAG phosphor particles is 1 µm or more, the YAG phosphor particles can be substantially uniformly dispersed in the green body. If the average particle size of the YAG phosphor is 50 µm or less, voids in the wavelength conversion member are reduced, and thus the light conversion efficiency is enhanced. In the present specification, the average particle size of the phosphor is an average particle size (Fisher sub-sieve sizer's number) measured with a Fisher sub-sieve sizer (hereinafter also referred to as an "FSSS").

Relative to the total amount, which is 100% by mass, of the YAG phosphor and the alumina particles, the content of the YAG phosphor is preferably in a range of 0.1% by mass to 99.9% by mass, more preferably 0.5% by mass to 99% by mass, further preferably 1% by mass to 95% by mass, even more preferably 2% by mass to 80% by mass, even more preferably 3% by mass to 70% by mass, even more preferably 3% by mass to 50% by mass, even more preferably 4% by mass to 50% by mass, particularly preferably 5% by mass to 50% by mass.

The alumina particles contained in the powder body constituting the green body preferably have an alumina purity of 99.0% by mass or more, more preferably 99.5% by mass or more. If the powder body constituting the green body contains alumina particles with an alumina purity of 99.0% by mass or more, the light conversion efficiency is enhanced, and a wavelength conversion member having a good thermal conductivity is obtained. In the case where commercially available alumina particles are used, the value of the alumina purity in the catalog is available. In the case where the alumina purity is unknown, the alumina purity can be measured by measuring the mass of alumina particles, sintering the alumina particles at 800° C. for 1 hour in the air atmosphere to remove the organic content adhering to the alumina particles and water absorbed by the alumina particles, measuring the mass of the sintered alumina particles, and dividing the mass of the sintered alumina particles by the mass of the unsintered alumina particles. For example, the alumina purity can be calculated using the following equation.

The alumina purity (% by mass)=(the mass of sintered alumina particles÷the mass of unsintered alumina particles)×100

The average particle size of the alumina particles is preferably in a range of 0.2 µm to 1.3 µm, more preferably 0.2 µm to 1.0 µm, further preferably 0.3 µm to 0.8 µm, even more preferably 0.3 µm to 0.6 µm. If the average particle size of the alumina particles is in the above range, the YAG phosphor powder can be uniformly mixed with the alumina particles, and a wavelength conversion member made of a sintered body with fewer voids and a high density can be manufactured. In the present specification, the average particle size of the alumina particles is a particle size (median diameter) at a cumulative volume frequency of 50% from the small-diameter side measured by the laser diffraction/scattering particle size distribution analysis.

Relative to the total amount, which is 100% by mass, of the YAG phosphor and the alumina particles, the content of the alumina particles with an alumina purity of 99.0% by mass or more is preferably in a range of 0.1% by mass to 99.9% by mass, more preferably 1% by mass to 99.5% by mass, further preferably 5% by mass to 99% by mass, even more preferably 20% by mass to 98% by mass, even more preferably 30% by mass to 97% by mass, even more preferably 50% by mass to 97% by mass, even more preferably 50% by mass to 96% by mass, particularly preferably 50% by mass to 95% by mass.

The powder body constituting the green body may contain, in addition to the YAG phosphor particles and the alumina particles with an alumina purity of 99.0% by mass or more, a powder that does not hinder light conversion by the YAG phosphor particles and transmits light from a light-emitting element. A powder, other than the YAG phosphor particles and the alumina particles with an alumina purity of 99.0% by mass or more, constituting the green body preferably has a comparatively high thermal conductivity. This structure facilitates releasing of heat applied to the YAG phosphor particles to the outside and improves heat dissipation performance of the wavelength conversion member. Examples of the powder that transmits light from a light-emitting element include a powder containing at least one of MgO, LiF, $Nb_2O_5$, NiO, $SiO_2$, $TiO_2$, and $Y_2O_3$. A powder having a crystal structure containing two or more selected from the group consisting of MgO, LiF, $SiO_2$, $TiO_2$, and $Y_2O_3$ may be used as the powder that transmits light from a light-emitting element.

In the case where the powder body constituting the green body contains a powder (hereinafter also referred to as the "other powder") other than the YAG phosphor and alumina particles with an alumina purity of 99.0% by mass or more, the total amount of the other powder and the alumina particles is 99.9% by mass or less, more preferably 98.0% by mass or less, further preferably 95.0% by mass or less, even more preferably 90.0% by mass or less, and preferably 0.1% by mass or more, more preferably 1.0% by mass or more, relative to 100% by mass of the powder constituting the green body. The compounding ratio (alumina particles:other powder) between the alumina particles and the other powder is preferably 1:99 to 99:1, more preferably 10:90 to 90:10.

FIG. 1 is a flowchart showing an illustrative order of steps in the method for manufacturing a wavelength conversion member according to the first embodiment. Steps in the method for manufacturing a wavelength conversion member will be described referring to FIG. 1. The method for manufacturing a wavelength conversion member includes Step S102 of providing a green body, Step S103 of primary sintering, and Step S104 of secondary sintering. The method for manufacturing a wavelength conversion member may include Step S101 of mixing powders before Step S102 of providing a green body and may include Step S105 of processing the wavelength conversion member after Step S104 of secondary sintering.

Step of Mixing Powders

In the step of mixing powders, powders constituting the green body are mixed. The powders constituting the green body include the YAG phosphor particles and the alumina particles with an alumina purity of 99.0% by mass or more. The powders can be mixed using a mortar and pestle. The powders may be mixed using a mixing medium such as balls for a ball mill. A small amount of a shaping auxiliary, such as water and ethanol, may be used to facilitate mixing of the powders and shaping of the mixed powder body. The shaping auxiliary is preferably evaporated easily in the subsequent steps of sintering. In the case where the shaping auxiliary is added, the amount of the shaping auxiliary is preferably 10% by mass or less, more preferably 8% by mass or less, further preferably 5% by mass or less, relative to 100% by mass of the powder body.

Step of Providing Green Body

In the step of providing a green body, the powder body containing the YAG phosphor is shaped into a desired shape to provide a green body. The powder body can be shaped by a known method, such as press forming including press molding and cold isostatic pressing (hereinafter also referred to as "CIP"). Two shaping methods may be employed to adjust the shape of the green body. CIP may be performed after press molding. In CIP, the green body is preferably pressed by cold hydrostatic isostatic pressing using water as the medium.

The pressure in press molding is preferably 5 MPa to 50 MPa, more preferably 5 MPa to 20 MPa. If the pressure in the press molding is in the above range, the green body can be adjusted to a desired shape.

The pressure in the CIP treatment is preferably 50 MPa to 200 MPa, more preferably 50 MPa to 180 MPa. If the pressure in the CIP treatment is in the above range, a green body having an enhanced, substantially uniform density on the whole is provided, and the density of the sintered body obtained can be enhanced through the following step of primary sintering and step of secondary sintering.

Step of Primary Sintering

In the step of primary sintering, the green body is primary-sintered to provide the first sintered body. By enhancing the sintered density of the YAG phosphor particles or the sintered density of the YAG phosphor particles and the other powder contained in the green body through the step of primary sintering, the density of the sintered body can be further enhanced through secondary sintering after primary sintering.

Primary sintering is preferably performed in an oxygen-containing atmosphere. The oxygen-containing atmosphere is an atmosphere containing at least oxygen. The oxygen concentration in the atmosphere is 5% by volume or more, preferably 10% by volume or more, more preferably 15% by volume or more. The oxygen-containing atmosphere for primary sintering is preferably the air (which has an oxygen concentration of about 20% by volume). By primary-sintering the green body in the oxygen-containing atmosphere, the color of the green body that has changed into black, the change being attributable to deterioration of the YAG phosphor particles due to sintering, is restored.

The temperature in primary sintering is preferably in a range of 1200° C. to 1800° C., more preferably 1500° C. to 1800° C., even more preferably 1600° C. to 1780° C. If the temperature in primary sintering is 1200° C. or more, the sintered density of the sintered body is enhanced, and the density of the second sintered body can be further enhanced through secondary sintering after primary sintering. If the temperature in primary sintering is 1800° C. or less, the sintered body can be formed without melting the green body.

Step of Secondary Sintering

In the step of secondary sintering, the first sintered body is subjected to the hot isostatic pressing (HIP) treatment (hereinafter also referred to as the "HIP treatment") to provide the second sintered body. In the step of secondary sintering, the HIP treatment reduces voids in the first sintered body and enhances the density of the second sintered body.

Secondary sintering is preferably performed in an inert gas atmosphere. Since secondary sintering involves the HIP treatment, a pressure medium for the HIP treatment is preferably an inert gas atmosphere. The inert gas atmosphere means an atmosphere containing a substance such as argon, helium, and nitrogen as the main component. The expression that an atmosphere contains a substance such as argon, helium, and nitrogen as the main component means that the atmosphere contains 50% by volume or more of at least one gas selected from the group consisting of argon, helium, and nitrogen. The oxygen concentration in the inert gas atmosphere is preferably 3% by volume or less, more preferably 1% by volume or less.

The pressure in the HIP treatment in secondary sintering is preferably in a range of 50 MPa to 300 MPa, more preferably 80 MPa to 200 MPa. If the pressure in the HIP treatment is in the above range, the density of the sintered body on the whole can be uniformly enhanced without destroying the crystal structure of the YAG phosphor particles.

The temperature in secondary sintering is preferably in a range of 1500° C. to 1800° C., more preferably 1600° C. to 1780° C., further preferably 1600° C. to 1770° C. If the temperature in secondary sintering is 1500° C. or more, the sintered density of the sintered body is enhanced. If the temperature in secondary sintering is 1800° C. or less, the sintered body can be formed without melting the sintered body.

Step of Processing

The method for manufacturing a wavelength conversion member may include the step of processing the resulting wavelength conversion member. Examples of the step of processing include cutting the resulting wavelength conversion member into a desired size. The wavelength conversion member can be cut by a known method, such as blade dicing, laser dicing, and wire sawing. Wire sawing is particularly preferable because a flat cut surface is formed with high precision. A wavelength conversion member with a desired thickness and size can be obtained through the step of processing. The thickness of the wavelength conversion member is not limited to particular values, but is preferably in a range of 1 μm to 1 mm, more preferably 10 μm to 800 μm, further preferably 50 μm to 500 μm, even more preferably 100 μm to 300 μm in consideration of the mechanical strength and the efficiency of wavelength conversion.

Method for Manufacturing Wavelength Conversion Member According to Second Embodiment A method for manufacturing a wavelength conversion member according to a second embodiment of the present disclosure includes providing a green body containing a YAG phosphor and alumina particles with an alumina purity of 99.0% by mass or more, primary-sintering the green body to obtain a first sintered body, secondary-sintering the first sintered body by applying the hot isostatic pressing (HIP) treatment to obtain a second sintered body, and annealing the second sintered body in an oxygen-containing atmosphere.

Figure 2:
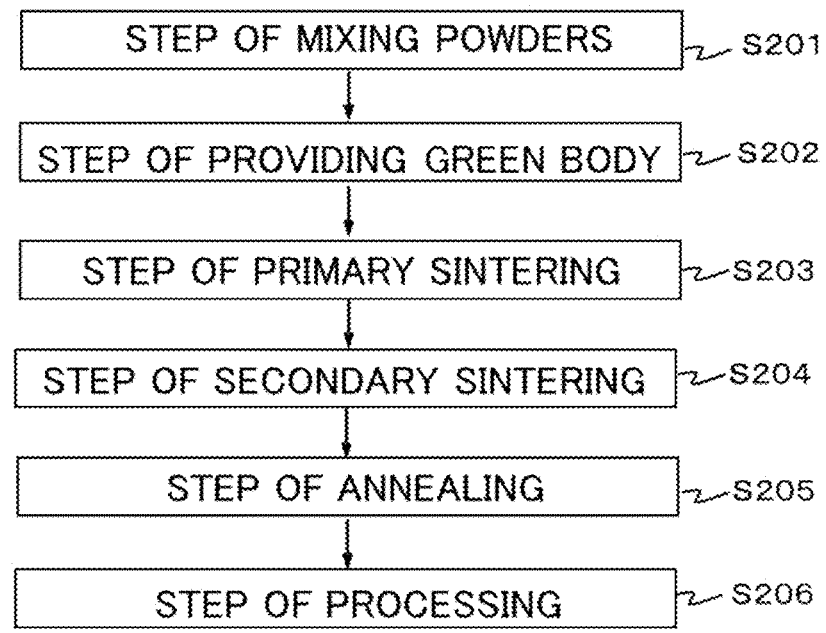
FIG. 2 is a flowchart showing the order of steps in a method for manufacturing a wavelength conversion member in a second embodiment of the present disclosure.

FIG. 2 is a flowchart showing an illustrative order of steps in the method for manufacturing a wavelength conversion member according to the second embodiment. Steps in the method for manufacturing a wavelength conversion member will be described referring to FIG. 2. The method for manufacturing a wavelength conversion member includes Step S202 of providing a green body, Step S203 of primary sintering, Step S204 of secondary sintering, and Step S205 of annealing. The method for manufacturing a wavelength conversion member may include Step S201 of mixing powders before Step S202 of providing a green body and may include Step S206 of processing the wavelength conversion member after Step S205 of annealing.

Examples of the YAG phosphor include YAG phosphors represented by $Y_3Al_5O_{12}$:Ce and YAG phosphors represented by $(Y,Gd)_3(Al,Ga)_5O_{12}$:Ce. The YAG phosphor includes a YAG phosphor with a composition represented by Formula (I). The YAG phosphors represented by $Y_3Al_5O_{12}$:Ce may include a YAG phosphor having a composition in which at least part of yttrium is substituted with an element such as terbium (Tb) and lutetium (Lu). The content of the YAG phosphor particles in the powder body constituting the green body is in a range similar to the range of the content of the YAG phosphor in the manufacturing method in the first embodiment.

A material like the alumina particles with an alumina purity of 99.0% by mass or more in the manufacturing method according to the first embodiment can be used. The content of the alumina particles in the powder body constituting the green body is also in a range similar to the range of the content of the alumina particles in the manufacturing method according to the first embodiment.

The method for manufacturing a wavelength conversion member according to the second embodiment includes steps similar to the step of providing a green body, the step of primary sintering, and the step of secondary sintering in the method for manufacturing a wavelength conversion member according to the first embodiment. Also in the method for manufacturing a wavelength conversion member according to the second embodiment, as in the step of providing a green body in the method for manufacturing a wavelength conversion member according to the first embodiment, a powder that does not hinder light conversion by the YAG phosphor particles and transmits light from a light-emitting element may be included in addition to the YAG phosphor particles and the alumina particles with an alumina purity of 99.0% by mass or more in the step of providing a green body.

Step of Annealing

The method for manufacturing a wavelength conversion member according to the second embodiment includes the step of annealing. In the step of annealing, the second sintered body is annealed in an oxygen-containing atmosphere to provide the wavelength conversion member. In the step of secondary sintering, the second sintered body with an enhanced density is obtained, but the second sintered body becomes black in some cases. One of the reasons for this change in color appears to be changes in the proportion of oxygen, which is one of constituent elements in the composition of the YAG phosphor, in the composition in the step of secondary sintering. Accordingly, in the case where the second sintered body has become black after the step of secondary sintering, the sintered body returns to the original body color of the YAG phosphor through the step of annealing without reducing the density of the sintered body enhanced in the step of secondary sintering. The wavelength conversion member after the step of annealing has an original light body color of the YAG phosphor on the whole and has smaller black regions, which absorbs light, and thus the light conversion efficiency is enhanced.

Annealing is performed in an oxygen-containing atmosphere. The oxygen-containing atmosphere is an atmosphere containing at least oxygen. The oxygen concentration in the atmosphere is 5% by volume or more, preferably 10% by volume or more, more preferably 15% by volume or more. Annealing is performed preferably in the air (which has an oxygen concentration of about 20% by volume) atmosphere.

The temperature in annealing is preferably in a range of 1200° C. to 1700° C., more preferably 1570° C. to 1700° C., even more preferably 1580° C. to 1630° C. If the temperature in annealing is 1200° C. or more, the second sintered body returns from a dark blackish color to the original body color of the YAG phosphor without reducing the density of the second sintered body. If the temperature in annealing is 1700° C. or less, the second sintered body returns from a dark blackish color to the original body color of the YAG phosphor while maintaining the crystal structure of the second sintered body.

Like the method for manufacturing a wavelength conversion member according to the first embodiment, the method for manufacturing a wavelength conversion member according to the second embodiment may include a step of processing the resulting wavelength conversion member. The step of processing can be similar to the step of processing in the method for manufacturing a wavelength conversion member according to the first embodiment.

Relative Density of First Sintered Body

In the methods for manufacturing a wavelength conversion member according to the first and second embodiments, the first sintered body obtained through the step of primary sintering has a relative density of preferably 95% or more, more preferably 96% or more. If the relative density of the first sintered body is 95% or more, the density of the second sintered body is further enhanced in secondary sintering after primary sintering, voids in the wavelength conversion member are reduced, and scattering of light in the voids is suppressed. Hence, a wavelength conversion member with a high light conversion efficiency can be manufactured.

In the present specification, the relative density of the first sintered body means a value calculated from the apparent density of the first sintered body relative to the true density of the first sintered body. The relative density is calculated using Equation (1) below.

The relative density (%)=(the apparent density of the first sintered body÷the true density of the first sintered body)×100     (1)

The true density of the first sintered body is the sum of a value obtained by multiplying the mass ratio of the YAG phosphor to the total amount of the YAG phosphor, the alumina particles, and the other powder by the true density of the YAG phosphor, and a value obtained by multiplying the mass ratio of the alumina particles and the other powder by the true density of the alumina particles and the other powder. In the case where the first sintered body contains the YAG phosphor and the alumina particles and does not contain the other powder, the sum of a value obtained by multiplying the mass ratio of the alumina particles to the total amount of the YAG phosphor and the alumina particles by the true density of the alumina particles, and a value obtained by multiplying the mass ratio of the YAG phosphor by the true density of the YAG phosphor is meant. For example, the true density of the first sintered body is calculated using Equation (2) below.

The true density of the first sintered body=(the mass ratio of the YAG phosphor to the total amount of the YAG phosphor and the alumina particles×the true density of the YAG phosphor)+(the mass ratio of the alumina particles to the total amount of the YAG phosphor and the alumina particles×the true density of the alumina particles)     (2)

The apparent density of the first sintered body means a value obtained by dividing the mass of the first sintered body by the volume of the first sintered body calculated by the Archimedes' method. The apparent density of the first sintered body is calculated using Equation (3) below.

The apparent density of the first sintered body=the mass of the first sintered body÷the volume of the first sintered body calculated by the Archimedes' method     (3)

Relative Density of Wavelength Conversion Member

In the methods for manufacturing a wavelength conversion member according to the first and second embodiments, the wavelength conversion member obtained after secondary sintering or annealing preferably has a relative density of 97% or more. If the relative density of the wavelength conversion member is 97% or more, voids in the wavelength conversion member are reduced, and thus the light conversion efficiency is enhanced. If the wavelength conversion member having a relative density of 97% or more is obtained after secondary sintering or annealing, for example, processing in the step of processing does not cause chipping, in other words, processing of the wavelength conversion member is facilitated.

In the present specification, the relative density of the wavelength conversion member means a value calculated from the apparent density of the wavelength conversion member relative to the true density of the wavelength conversion member. The relative density is calculated using Equation (4) below.

The relative density (%)=(the apparent density of the wavelength conversion member÷the true density of the wavelength conversion member)×100     (4)

The true density of the wavelength conversion member is calculated in a similar way to the true density of the first sintered body.

The apparent density of the wavelength conversion member means a value obtained by dividing the mass of the wavelength conversion member by the volume of the wavelength conversion member calculated by the Archimedes' method. The apparent density of the wavelength conversion member is calculated using Equation (5) below.

The apparent density of the wavelength conversion member=the mass of the wavelength conversion member÷the volume of the wavelength conversion member calculated by the Archimedes' method     (5)

The wavelength conversion member obtained by the manufacturing method according to the present embodiment has a high density, high relative emission intensity, and high light conversion efficiency.

In the wavelength conversion member, YAG phosphor particles differentiated from a molten alumina matrix by grain boundaries are present in the alumina matrix. The alumina particles and the YAG phosphor constitute the ceramic wavelength conversion member in an integrated manner. In the step of providing a green body before primary sintering in the first and second embodiments, the green body is provided by mixing the YAG phosphor with the alumina particles instead of mixing raw materials constituting the YAG phosphor with the alumina particles, and the wavelength conversion member is obtained through primary sintering and secondary sintering. Observation of a cross-sectional micrograph of the wavelength conversion member reveals that the alumina matrix made of molten alumina particles integrated with one another is studded with the YAG phosphor particles differentiated from the matrix by grain boundaries. Since the YAG phosphor particles are substantially uniformly dispersed in the alumina matrix and since the wavelength conversion member has a relative density of 97% or more, fracturing and chipping are prevented even in the case where the ceramic wavelength conversion member is subjected to processing such as cutting, and unevenness in color is reduced in the case where the wavelength conversion member is used for a light-emitting device.

In combination with a light-emitting element, the wavelength conversion member obtained by the manufacturing method according to the first embodiment or the manufacturing method according to the second embodiment converts light emitted from the light-emitting element and can constitute a light-emitting device that emits mixed light of light from the light-emitting element and light that has undergone wavelength conversion by the wavelength conversion member. For example, a light-emitting element that emits light in a wavelength range of 350 nm to 500 nm can be used as the light-emitting element. For example, a semiconductor light-emitting element including a nitride semiconductor ($In_XAl_YGa_{1-X-Y}N$, $0 \leq X$, $0 \leq Y$, $X+Y \leq 1$) can be used as the light-emitting element. Using a semiconductor light-emitting element as an excitation light source enables a high-efficiency stable light-emitting device that has high linearity of output relative to input and is resistant to mechanical shock to be obtained.

EXAMPLES

The present invention will be specifically described below referring to examples. The present invention is not limited to these examples.

Manufacturing Example of YAG Phosphors

Yttrium oxide ($Y_2O_3$), gadolinium oxide ($Gd_2O_3$), cerium oxide ($CeO_2$), and aluminum oxide ($Al_2O_3$) were each measured to achieve composition ratios in examples and comparative examples to provide raw-material mixtures. Barium fluoride ($BaF_2$) was added as a flux, and each raw-material mixture was mixed with the flux using a ball mill. The mixture was put into an alumina crucible and sintered at a temperature in a range of 1400° C. to 1600° C. for 10 hours in a reducing atmosphere to provide a sintered product. The resulting sintered product was dispersed in pure water and classified by wet sieving with application of various vibrations via the sieve in a flow of the solvent followed by dry sieving after removing water and drying the product, so that a phosphor having a target composition used in each of Examples 1 to 19 and Comparative Examples 1 to 4 was provided. The composition and the average particle size of each phosphor were measured by the methods below. Table 1 shows the results.

Average Particle Size

The volume average particle size (median diameter) of the resulting phosphor at a cumulative volume frequency of 50% from the small-diameter side was measured with a laser-diffraction particle size analyzer (product name: Mastersizer 3000, manufactured by Malvern Instruments Ltd), and the measured value was employed as the average particle size particle size.

Composition Analysis

The mass percentages (% by mass) of elements (Y, Gd, Ce, and Al) except for oxygen constituting the YAG phosphor in the resulting phosphor were measured with an inductively coupled plasma atomic emission spectrometer (ICP-AES) (product name: manufactured by PerkinElmer Inc.), and the molar ratio of each element was calculated from the mass percentage of the element. Assuming that the measured molar ratio of Al was 5, the molar ratio (variable a) of Gd and the molar ratio (variable b) of Ce shown in Table 1 were calculated on the basis of the molar ratio 5 of Al.

Example 1

A mixed powder for a green body was provided by weighing 25 parts by mass of a YAG phosphor having an average particle size of 5 μm represented by ($Y_{0.921}Gd_{0.070}Ce_{0.009})_3Al_5O_{12}$ obtained in the manufacturing example of YAG phosphors and 75 parts by mass of α-alumina particles (product name: AHP200, manufactured by Nippon Light Metal Co., Ltd., alumina purity: 99.5% by mass) having an average particle size of 0.40 μm, and mixing the materials using a dry ball mill. The alumina purity of the α-alumina particles was measured by a method similar to the method for measuring an alumina purity described later. After removing balls used as a mixing medium from the mixed powder, the mixed powder was filled into a mold, and a cylindrical green body having a diameter of 20 mm and a thickness of 20 mm was formed with a pressure of 19.6 MPa (200 kgf/cm²). The resulting green body was put into a packaging container, vacuum-packed, and then subjected to the CIP treatment with a cold hydrostatic isostatic pressing device (manufactured by Kobe Steel, Ltd.) at 176 MPa. The resulting green body was kept in the air atmosphere (oxygen concentration: about 20% by volume) at a temperature of 1700° C. for 6 hours in a sintering furnace (manufactured by Marusho Denki Co., Ltd.) to perform primary sintering to provide a first sintered body. The resulting first sintered body was subjected to secondary sintering involving the HIP treatment with an HIP device (manufactured by Kobe Steel, Ltd.) using nitrogen gas as the pressure medium in a nitrogen gas atmosphere (nitrogen: 99% by volume or more) at 1750° C. and 198 MPa for 2 hours to provide a second sintered body. The resulting second sintered body was regarded as a wavelength conversion member.

Example 2

A wavelength conversion member was obtained in substantially the same manner as Example 1 except that a mixed powder was provided by mixing 40 parts by mass of the YAG phosphor and 60 parts by mass of the α-alumina particles.

Example 3

A wavelength conversion member was obtained in substantially the same manner as Example 1 except that a mixed powder was provided by mixing 50 parts by mass of the YAG phosphor and 50 parts by mass of the α-alumina particles.

Example 4

A mixed powder for a green body was provided by weighing 15 parts by mass of a YAG phosphor having an average particle size of 5 μm represented by ($Y_{0.862}Gd_{0.130}Ce_{0.008})_3Al_5O_{12}$ obtained in the manufacturing example of YAG phosphors and 85 parts by mass of α-alumina particles (product name: AHP200, manufactured by Nippon Light Metal Co., Ltd., alumina purity: 99.5% by mass) having an average particle size of 0.40 μm, and mixing the materials using a dry ball mill. After removing balls used as a mixing medium from the mixed powder, the mixed powder was filled into a mold, and a cylindrical green body having a diameter of 20 mm and a thickness of 20 mm was formed with a pressure of 19.6 MPa (200 kgf/cm²). The resulting green body was put into a packaging container, vacuum-packed, and then subjected to the CIP treatment with a cold hydrostatic isostatic pressing device (manufactured by Kobe Steel, Ltd.) at 176 MPa. The resulting green body was kept in the air atmosphere (oxygen concentration: about 20% by volume) at a temperature of 1700° C. for 6 hours in a sintering furnace (manufactured by Marusho Denki Co., Ltd.) to perform primary sintering to provide a first sintered body.

The resulting first sintered body was subjected to secondary sintering involving the HIP treatment with an HIP device (manufactured by Kobe Steel, Ltd.) using nitrogen gas as the pressure medium in a nitrogen gas atmosphere (nitrogen: 99% by volume or more) at 1750° C. and 198 MPa for 2 hours to provide a second sintered body. The resulting second sintered body was regarded as a wavelength conversion member.

Example 5

A wavelength conversion member was obtained in substantially the same manner as Example 4 except that a mixed powder was provided by mixing 20 parts by mass of the YAG phosphor and 80 parts by mass of the α-alumina particles.

Example 6

A mixed powder for a green body was provided by weighing 25 parts by mass of a YAG phosphor having an average particle size of 5 μm represented by $(Y_{0.746}Gd_{0.250}Ce_{0.004})_3Al_5O_{12}$ obtained in the manufacturing example of YAG phosphors and 75 parts by mass of α-alumina particles (product name: AHP200, manufactured by Nippon Light Metal Co., Ltd., alumina purity: 99.5% by mass) having an average particle size of 0.40 μm, and mixing the materials using a dry ball mill. After removing balls used as a mixing medium from the mixed powder, the mixed powder was filled into a mold, and a cylindrical green body having a diameter of 20 mm and a thickness of 20 mm was formed with a pressure of 19.6 MPa (200 kgf/cm$^2$). The resulting green body was put into a packaging container, vacuum-packed, and then subjected to the CIP treatment with a cold hydrostatic isostatic pressing device (manufactured by Kobe Steel, Ltd.) at 176 MPa. The resulting green body was kept in the air atmosphere (oxygen concentration: about 20% by volume) at a temperature of 1700° C. for 6 hours in a sintering furnace (manufactured by Marusho Denki Co., Ltd.) to perform primary sintering to provide a first sintered body.

The resulting first sintered body was subjected to secondary sintering involving the HIP treatment with an HIP device (manufactured by Kobe Steel, Ltd.) using nitrogen gas as the pressure medium in a nitrogen gas atmosphere (nitrogen: 99% by volume or more) at 1750° C. and 198 MPa for 2 hours to provide a second sintered body. The resulting second sintered body was regarded as a wavelength conversion member.

Example 7

A wavelength conversion member was obtained in substantially the same manner as Example 6 except that a YAG phosphor having an average particle size of 5 μm represented by $(Y_{0.927}Gd_{0.070}Ce_{0.003})_3Al_5O_{12}$ obtained in the manufacturing example of YAG phosphors was used.

Example 8

A wavelength conversion member was obtained in substantially the same manner as Example 6 except that a YAG phosphor having an average particle size of 5 μm represented by $(Y_{0.897}Gd_{0.100}Ce_{0.003})_3Al_5O_{12}$ obtained in the manufacturing example of YAG phosphors was used.

Example 9

A wavelength conversion member was obtained in substantially the same manner as Example 6 except that a YAG phosphor having an average particle size of 5 μm represented by $(Y_{0.867}Gd_{0.130}Ce_{0.003})_3Al_5O_{12}$ obtained in the manufacturing example of YAG phosphors was used.

Example 10

A wavelength conversion member was obtained in substantially the same manner as Example 6 except that a YAG phosphor having an average particle size of 5 μm represented by $(Y_{0.797}Gd_{0.200}Ce_{0.003})_3Al_5O_{12}$ obtained in the manufacturing example of YAG phosphors was used.

Example 11

A mixed powder for a green body was provided by weighing 25 parts by mass of a YAG phosphor having an average particle size of 12 μm represented by $(Y_{0.922}Gd_{0.070}Ce_{0.008})_3Al_5O_{12}$ obtained in the manufacturing example of YAG phosphors and 75 parts by mass of α-alumina particles (product name: AHP200, manufactured by Nippon Light Metal Co., Ltd., alumina purity: 99.5% by mass) having an average particle size of 0.40 μm, and mixing the materials using a dry ball mill. After removing balls used as a mixing medium from the mixed powder, the mixed powder was filled into a mold, and a cylindrical green body having a diameter of 20 mm and a thickness of 20 mm was formed with a pressure of 19.6 MPa (200 kgf/cm$^2$). The resulting green body was put into a packaging container, vacuum-packed, and then subjected to the CIP treatment with a cold hydrostatic isostatic pressing device (manufactured by Kobe Steel, Ltd.) at 176 MPa. The resulting green body was kept in the air atmosphere (oxygen concentration: about 20% by volume) at a temperature of 1700° C. for 6 hours in a sintering furnace (manufactured by Marusho Denki Co., Ltd.) to perform primary sintering to provide a first sintered body.

The resulting first sintered body was subjected to secondary sintering involving the HIP treatment with an HIP device (manufactured by Kobe Steel, Ltd.) using nitrogen gas as the pressure medium in a nitrogen gas atmosphere (nitrogen: 99% by volume or more) at 1750° C. and 198 MPa for 2 hours to provide a second sintered body. The resulting second sintered body was regarded as a wavelength conversion member.

Example 12

A wavelength conversion member was obtained in substantially the same manner as Example 11 except that a mixed powder was provided using 30 parts by mass of the YAG phosphor and 70 parts by mass of the α-alumina particles.

Example 13

A wavelength conversion member was obtained in substantially the same manner as Example 11 except that a mixed powder was provided using 40 parts by mass of the YAG phosphor and 60 parts by mass of the α-alumina particles.

Example 14

A wavelength conversion member was obtained in substantially the same manner as Example 11 except that a mixed powder was provided using 50 parts by mass of the YAG phosphor and 50 parts by mass of the α-alumina particles.

Example 15

A wavelength conversion material was obtained in substantially the same manner as Example 11 except that a YAG phosphor having an average particle size of 12 μm represented by $(Y_{0.921}Gd_{0.070}Ce_{0.009})_3Al_5O_{12}$ obtained in the manufacturing example of YAG phosphors was used.

Example 16

A wavelength conversion member was obtained in substantially the same manner as Example 11 except that a mixed powder was provided using 5 parts by mass of the YAG phosphor and 95 parts by mass of the α-alumina particles.

Example 17

A wavelength conversion member was obtained in substantially the same manner as Example 11 except that a mixed powder was provided using 7 parts by mass of the YAG phosphor and 93 parts by mass of the α-alumina particles.

Example 18

A wavelength conversion member was obtained in substantially the same manner as Example 11 except that a mixed powder was provided using 9 parts by mass of the YAG phosphor and 91 parts by mass of the α-alumina particles.

Example 19

A wavelength conversion member was obtained in substantially the same manner as Example 11 except that a mixed powder was provided using 15 parts by mass of the YAG phosphor and 85 parts by mass of the α-alumina particles.

Comparative Example 1

A mixed powder for a green body was provided by weighing 7 parts by mass of a YAG phosphor having an average particle size of 5 μm represented by $(Y_{0.976}Ce_{0.024})_3Al_5O_{12}$ and 93 parts by mass of α-alumina particles (product name: AHP200, manufactured by Nippon Light Metal Co., Ltd., alumina purity: 99.5% by mass) having an average particle size of 0.40 μm, and mixing the materials using a dry ball mill. After removing balls used as a mixing medium from the mixed powder, the mixed powder was filled into a mold, and a cylindrical green body having a diameter of 20 mm and a thickness of 20 mm was formed with a pressure of 19.6 MPa (200 kgf/cm²). The resulting green body was put into a packaging container, vacuum-packed, and then subjected to the CIP treatment with a cold hydrostatic isostatic pressing device (manufactured by Kobe Steel, Ltd.) at 176 MPa. The resulting green body was kept in the air atmosphere (oxygen concentration: about 20% by volume) at a temperature of 1700° C. for 6 hours in a sintering furnace (manufactured by Marusho Denki Co., Ltd.) to perform primary sintering to provide a first sintered body.

The resulting first sintered body was subjected to secondary sintering involving the HIP treatment with an HIP device (manufactured by Kobe Steel, Ltd.) using nitrogen gas as the pressure medium in a nitrogen gas atmosphere (nitrogen: 99% by volume or more) at 1750° C. and 198 MPa for 2 hours to provide a second sintered body. The resulting second sintered body was regarded as a wavelength conversion member.

Comparative Example 2

A wavelength conversion member was obtained in substantially the same manner as Comparative Example 1 except that a mixed powder was provided using 11 parts by mass of the YAG phosphor and 89 parts by mass of the α-alumina particles.

Comparative Example 3

A wavelength conversion member was obtained in substantially the same manner as Comparative Example 1 except that a mixed powder was provided using 15 parts by mass of the YAG phosphor and 85 parts by mass of the α-alumina particles.

Comparative Example 4

A wavelength conversion member was obtained in substantially the same manner as Comparative Example 1 except that a mixed powder was provided using 20 parts by mass of the YAG phosphor and 80 parts by mass of the α-alumina particles.

Measurement of Relative Density of First Sintered Body

The relative density of the first sintered body in each of Examples 1 to 19 and Comparative Examples 1 to 4 was measured. Table 1 shows the results.

The relative density was calculated using Equation (1) below.

The relative density (%)=(the apparent density of the first sintered body÷the true density of the first sintered body)×100   (1)

The true density of the first sintered body was calculated using Equation (2) below. The calculation was carried out supposing the true density of the α-alumina particles used in the examples and comparative examples to be 3.98 g/cm³; the true density of each YAG phosphor used in the Examples 1 to 3, Example 7, and Examples 11 to 19 to be 4.69 g/cm³; Example 4, Example 5, and Example 9 to be 4.77 g/cm³; Example 6 to be 4.92 g/cm³; Example 8 to be 4.73 g/cm³; Example 10 to be 4.86 g/cm³; and Comparative Examples 1 to 4 to be 4.60 g/cm³.

The true density of the first sintered body=(the mass ratio of the YAG phosphor to the total amount of the YAG phosphor and the alumina particles×the true density of the YAG phosphor)+ (the mass ratio of the alumina particles to the total amount of the YAG phosphor and the alumina particles×the true density of the alumina particles)   (2)

The apparent density of the first sintered body was calculated using Equation (3) below.

The apparent density of the first sintered body=the mass of the first sintered body÷the volume of the first sintered body calculated by the Archimedes' method   (3)

Measurement of Relative Density of Wavelength Conversion Member

The relative density of the wavelength conversion member in each of Examples 1 to 19 and Comparative Examples 1 to 4 was measured. Table 1 shows the results.

The relative density was calculated using Equation (4) below.

The relative density (%)=(the apparent density of the wavelength conversion member÷the true density of the wavelength conversion member)×100   (4)

The true density of the wavelength conversion member was calculated as the sum of a value obtained by multiplying the mass ratio of the alumina particles to the total amount of the YAG phosphor and the α-alumina particles by the true density of the alumina particles, and a value obtained by multiplying the mass ratio of the YAG phosphor particles to the total amount of the YAG phosphor and the α-alumina particles by the true density of the YAG phosphor particles. The true density of each YAG phosphor and the true density of the α-alumina particles were same as the values used in the calculation of the true density of the first sintered body.

The apparent density of the wavelength conversion member was calculated using Equation (5) below.

The apparent density of the wavelength conversion member=the mass of the wavelength conversion member÷the volume of the wavelength conversion member calculated by the Archimedes' method (5)

Measurement of Relative Emission Intensity

The wavelength conversion member in each of Examples 1 to 19 and Comparative Examples 1 to 4 was cut into a piece having a thickness of 300 μm with a wire saw to form a sample. The sample of the wavelength conversion member was irradiated with light emitted from a nitride semiconductor LED chip with an emission peak wavelength of 455 nm used as a light source, and the emission intensity at the emission peak wavelength in a wavelength range of 430 nm to 800 nm obtained from the sample of the wavelength conversion member in each of Examples 1 to 19 and Comparative Examples 1 to 4 irradiated with light from the light source was measured with a fluorescence spectrophotometer. Supposing the emission intensity at the emission peak wavelength in a wavelength range of 430 nm to 800 nm obtained from the sample of the wavelength conversion member in Comparative Example 1 to be 100%, the emission intensity at the emission peak wavelength in the wavelength range of 430 nm to 800 nm obtained from each sample was represented as a relative emission intensity (%). Table 1 shows the results.

Measurement of Light Conversion Efficiency

The wavelength conversion member in each of Examples 1 to 19 and Comparative Examples 1 to 4 was cut into a piece having a thickness of 300 μm with a wire saw to form a sample. The sample of the wavelength conversion member was irradiated with light emitted from a nitride semiconductor LED chip with an emission peak wavelength of 455 nm used as a light source, and the photon quantity absorbed by the sample of the wavelength conversion member in a wavelength range of 430 nm to 480 nm and the photon quantity emitted from the sample of the wavelength conversion member in a wavelength range of 490 nm to 800 nm were measured with an integrating sphere under the measurement conditions below. The ratio of the photon quantity emitted from the sample of the wavelength conversion member in the wavelength range of 490 nm to 800 nm to the photon quantity absorbed by the sample of the wavelength conversion member in the wavelength range of 430 nm to 480 nm was determined in terms of percentage and regarded as the light conversion efficiency (%). Table 1 shows the results.

Figure 3:
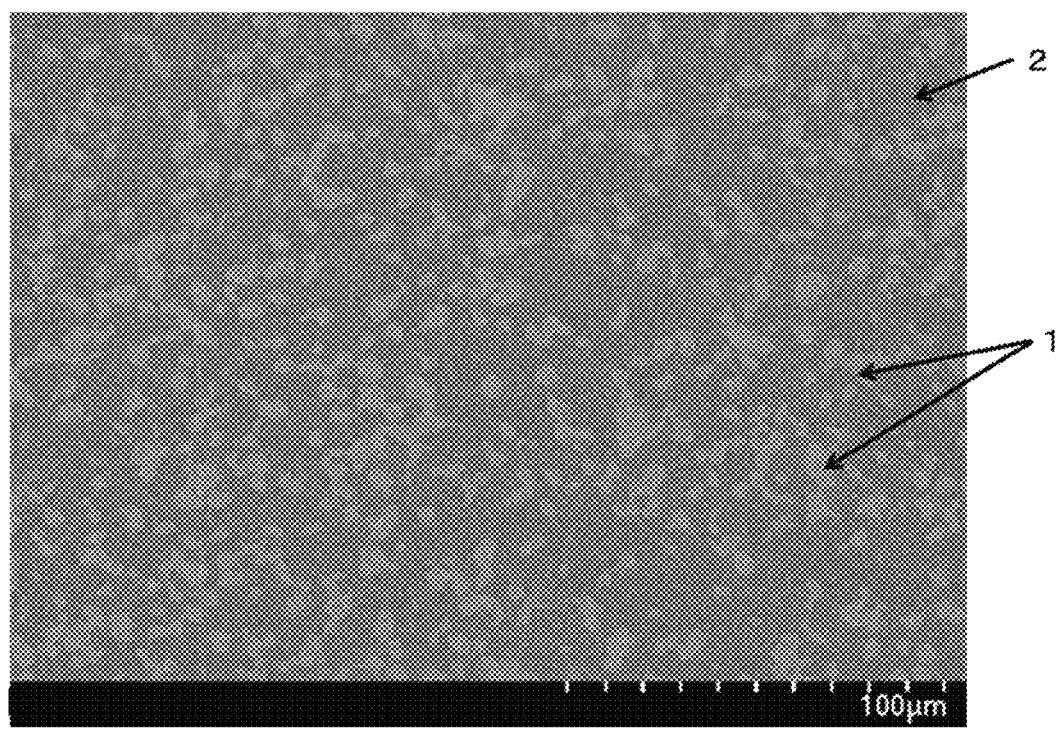
FIG. 3 is a cross-sectional SEM micrograph of a wavelength conversion member according to Example 1.
Figure 4:
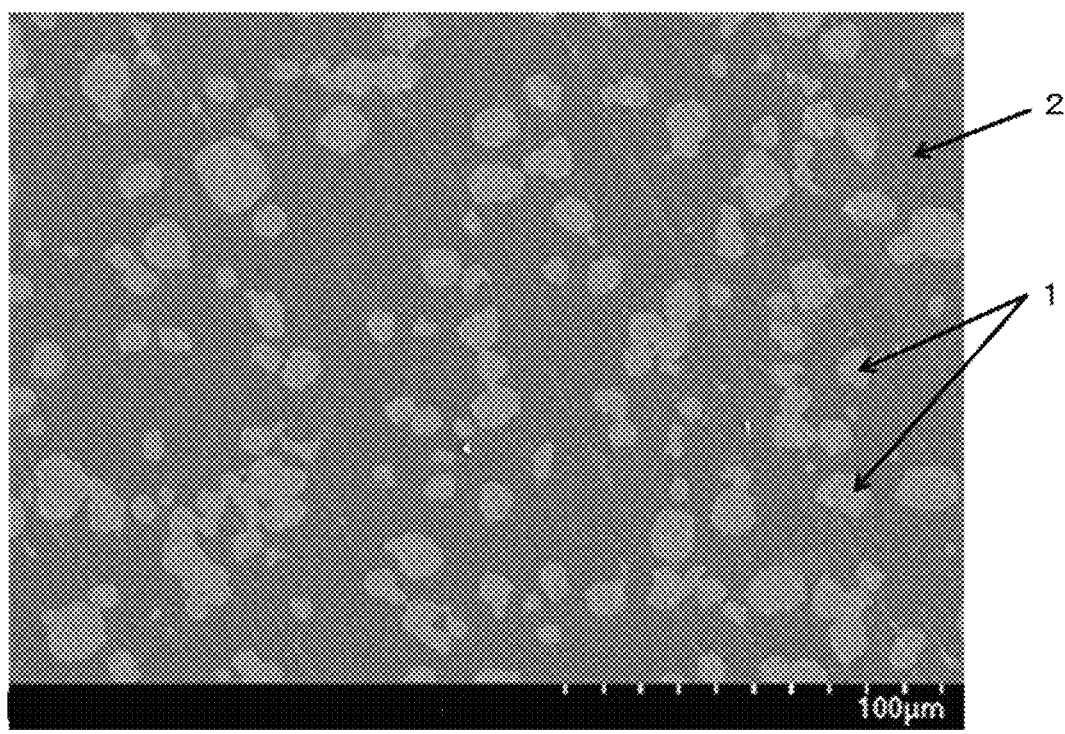
FIG. 4 is a cross-sectional SEM micrograph of a wavelength conversion member according to Example 11.

Conditions of measurement of light conversion efficiency
Current value of the excitation light source: 800 mA
Driving method of the excitation light source: pulsed (period: 5 millisecond, duty: 1%)
Detector: a multichannel spectroscope SEM Micrograph Cross-sectional SEM micrographs of the wavelength conversion members in Example 1 and Example 11 were obtained using a scanning electron microscope (SEM). FIG. 3 is a cross-sectional SEM micrograph of the wavelength conversion member in Example 1. FIG. 4 is a cross-sectional SEM micrograph of the wavelength conversion member in Example 11.

Photograph of External Appearance

Figure 5:
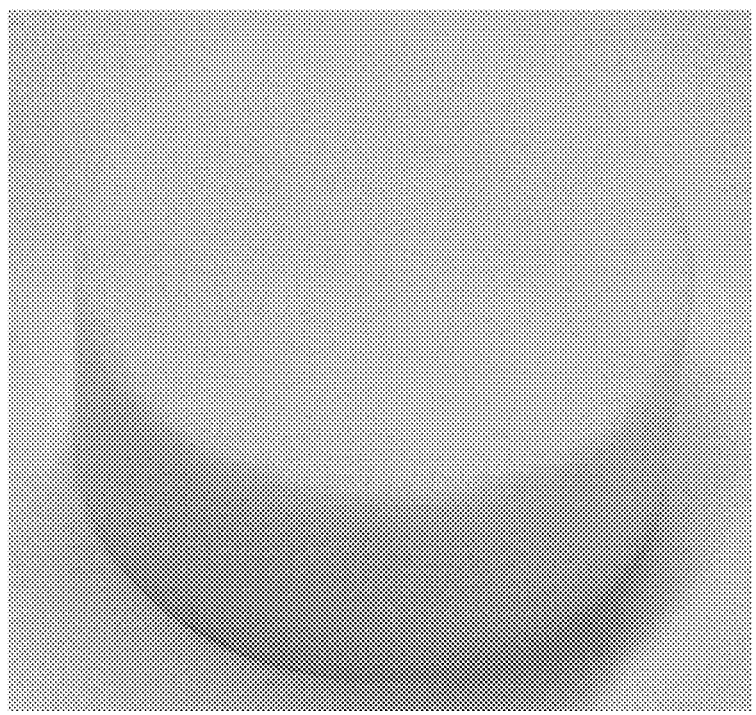
FIG. 5 is a photograph showing the external appearance of the wavelength conversion member according to Example 1.

A photograph showing the external appearance of Example 1 was obtained. FIG. 5 is a photograph showing the external appearance of the wavelength conversion member in Example 1.

TABLE 1

| | Particle size of phosphor (μm) | Variable a (Gd) | Variable b (Ce) | Relative density of first sintered body (%) | Phosphor content (% by mass) | Relative density of wavelength conversion member (%) | Relative emission intensity (%) | Light conversion efficiency (%) |
|---|---|---|---|---|---|---|---|---|
| Example 1 | 5 | 0.07 | 0.009 | 98.3 | 25 | 99.2 | 158.2 | 18.8 |
| Example 2 | 5 | 0.07 | 0.009 | 98.0 | 40 | 98.5 | 180.5 | 18.7 |
| Example 3 | 5 | 0.07 | 0.009 | 97.6 | 50 | 98.5 | 167.9 | 17.3 |
| Example 4 | 5 | 0.13 | 0.008 | 98.1 | 15 | 99.4 | 121.3 | 14.1 |
| Example 5 | 5 | 0.13 | 0.008 | 98.1 | 20 | 99.3 | 126.4 | 15.6 |
| Example 6 | 5 | 0.25 | 0.004 | 98.2 | 25 | 98.8 | 123.3 | 15.7 |
| Example 7 | 5 | 0.07 | 0.003 | 98.2 | 25 | 98.9 | 128.5 | 14.4 |
| Example 8 | 5 | 0.10 | 0.003 | 98.0 | 25 | 98.7 | 140.5 | 15.3 |
| Example 9 | 5 | 0.13 | 0.003 | 98.4 | 25 | 99.0 | 131.3 | 14.3 |
| Example 10 | 5 | 0.20 | 0.003 | 98.2 | 25 | 98.8 | 135.5 | 15.3 |
| Example 11 | 12 | 0.07 | 0.008 | 97.6 | 25 | 98.9 | 138.4 | 15.0 |
| Example 12 | 12 | 0.07 | 0.008 | 97.5 | 30 | 98.9 | 146.1 | 15.6 |
| Example 13 | 12 | 0.07 | 0.008 | 95.3 | 40 | 98.7 | 147.7 | 15.6 |
| Example 14 | 12 | 0.07 | 0.008 | 93.2 | 50 | 95.6 | 201.5 | 21.0 |
| Example 15 | 12 | 0.07 | 0.009 | 97.0 | 25 | 98.9 | 141.5 | 15.5 |
| Example 16 | 12 | 0.07 | 0.008 | 98.7 | 5 | 99.4 | 120.0 | 12.3 |
| Example 17 | 12 | 0.07 | 0.008 | 98.7 | 7 | 99.5 | 122.0 | 12.7 |
| Example 18 | 12 | 0.07 | 0.008 | 98.6 | 9 | 99.5 | 123.0 | 12.2 |
| Example 19 | 12 | 0.07 | 0.008 | 97.6 | 15 | 98.9 | 145.0 | 13.9 |
| Comparative Example 1 | 5 | 0 | 0.024 | 98.7 | 7 | 99.7 | 100.0 | 11.9 |
| Comparative Example 2 | 5 | 0 | 0.024 | 98.5 | 11 | 99.7 | 105.4 | 12.2 |
| Comparative Example 3 | 5 | 0 | 0.024 | 98.6 | 15 | 99.6 | 119.0 | 13.7 |
| Comparative Example 4 | 5 | 0 | 0.024 | 98.5 | 20 | 99.6 | 119.6 | 13.6 |

As shown in Table 1, the wavelength conversion members in Examples 1 to 19, which were each obtained by providing a green body containing a YAG phosphor with a composition represented by Formula (I) and alumina particles with an alumina purity of 99.0% by mass or more and subjecting the green body to primary sintering and secondary sintering, exhibited relative emission intensities higher than the relative emission intensities of the wavelength conversion members in Comparative Examples 1 to 4, which were each obtained by providing a green body containing a YAG phosphor not having a composition represented by Formula (I) and alumina particles and subjecting the green body to primary sintering and secondary sintering. The wavelength conversion members in Examples 1 to 19 exhibited light conversion efficiencies higher than the light conversion efficiency of Comparative Example 1.

As shown in Table 1, the wavelength conversion member in Example 14 that contained a YAG phosphor having a large average particle size beyond 10 μm and had a YAG phosphor content of as high as 50% by mass in the mixed powder constituting the green body exhibited a high relative emission intensity and a high light conversion efficiency but had a relative density of less than 97%.

As shown in Table 1, although the wavelength conversion members in Examples 16 to 18 each contained a YAG phosphor having a large average particle size beyond 10 μm and had a YAG phosphor content of as low as 5% by mass to 10% by mass relative to the total amount, which is 100% by mass, of the YAG phosphor and the alumina particles, the wavelength conversion members in Examples 16 to 18 exhibited higher relative emission intensities of as high as 120% or more than the relative emission intensity of the wavelength conversion member in Comparative Example 1 or Comparative Example 2.

As shown in the SEM micrograph in FIG. 3, in the wavelength conversion member in Example 1, YAG phosphor particles 1 differentiated from the alumina matrix by grain boundaries were present in molten alumina 2 constituting the matrix of the sintered body, and the alumina 2 constituting the matrix and the YAG phosphor particles 1 constituted the ceramic wavelength conversion member in an integrated manner.

As shown in the SEM micrograph in FIG. 4, in the wavelength conversion member in Example 11 containing YAG phosphor particles 1 having an average particle size as large as 12 μm, the YAG phosphor particles 1 clearly differentiated from the alumina 2 constituting the matrix by grain boundaries are observed.

Although not shown in the drawings, the wavelength conversion members in Examples 1 to 19 have high emission intensities and high light conversion efficiencies because the wavelength conversion members are each obtained by subjecting a mixed powder containing YAG phosphor particles manufactured in advance mixed with alumina particles to primary sintering and secondary sintering to prevent properties of the YAG phosphors in the wavelength conversion members from being impaired.

As shown in the photograph showing the external appearance in FIG. 5, the wavelength conversion member in Example 1 retained the original light body color of the YAG phosphor on the whole, which revealed that the wavelength conversion member was not deteriorated by primary sintering or secondary sintering involving the HIP treatment.

As Comparative Examples 1 to 4 show in Table 1, even in the case where the YAG phosphor content in the mixed powder constituting the green body was increased to 20% by mass, the wavelength conversion member obtained by subjecting the green body that contained a YAG phosphor not having a composition represented by Formula (I) and alumina particles to primary sintering and secondary sintering exhibited a lower relative emission intensity and a lower light conversion efficiency than the relative emission intensity and the light conversion efficiency in Example 5 in which the YAG phosphor content was the same value, that is, 20% by mass.

Subsequently, Examples 21 to 29, 32, and 34 to 37 and Comparative Examples 31 and 33 will be described.

Manufacturing Example 1-1 to Manufacturing Example 1-3

After weighing 20 parts by mass of a YAG phosphor having an average particle size of 20 μm represented by $Y_3Al_5O_{12}$:Ce (also represented by $(Y_{0.978}Ce_{0.022})_3Al_5O_{12}$) and 80 parts by mass of α-alumina particles (product name: AHP200, manufactured by Nippon Light Metal Co., Ltd.) having an average particle size of 0.40 μm, the materials were mixed using a dry ball mill. After removing balls used as a mixing medium from the mixed powder, the mixed powder was filled into molds, and cylindrical green bodies each having a diameter of 20 mm and a thickness of 20 mm were formed with a pressure of 19.6 MPa (200 kgf/cm$^2$). The resulting green bodies were each put into a packaging container, vacuum-packed, and then subjected to the CIP treatment with a cold hydrostatic isostatic pressing device (manufactured by Kobe Steel, Ltd.) at 176 MPa. The resulting green bodies were kept in the air atmosphere (oxygen concentration: about 20% by volume) at respective temperatures of 1700° C., 1750° C., and 1780° C. for 6 hours in a sintering furnace (manufactured by ADVANTEC Group) to perform primary sintering to provide first sintered bodies of Manufacturing Example 1-1, Manufacturing Example 1-2, and Manufacturing Example 1-3.

Manufacturing Example 2-1 to Manufacturing Example 2-3

A first sintered body in each of Manufacturing Example 2-1 to Manufacturing Example 2-3 was obtained in substantially the same manner as Manufacturing Example 1-1 to Manufacturing Example 1-3 except that α-alumina particles (product name: AKP-20, manufactured by Sumitomo Chemical Company, Limited) having an average particle size of 0.46 μm were used.

Manufacturing Example 3-1 to Manufacturing Example 3-3

A first sintered body in each of Manufacturing Example 3-1 to Manufacturing Example 3-3 was obtained in substantially the same manner as Manufacturing Example 1-1 to Manufacturing Example 1-3 except that α-alumina particles (product name: RA-40, manufactured by Iwatani Corporation) having an average particle size of 1.00 μm were used.

Manufacturing Example 4-1 to Manufacturing Example 4-3

A first sintered body in each of Manufacturing Example 4-1 to Manufacturing Example 4-3 was obtained in substantially the same manner as Manufacturing Example 1-1 to Manufacturing Example 1-3 except that α-alumina particles (product name: AHP300, manufactured by Nippon Light Metal Co., Ltd.) having an average particle size of 1.30 μm were used.

Manufacturing Example 5-1 to Manufacturing Example 5-3

A first sintered body in each of Manufacturing Example 5-1 to Manufacturing Example 5-3 was obtained in substantially the same manner as Manufacturing Example 1-1 to Manufacturing Example 1-3 except that activated alumina particles (γ-alumina) (product name: RG-40, manufactured by Iwatani Corporation) having an average particle size of 0.51 μm were used.

Manufacturing Example 6

A first sintered body in Manufacturing Example 6 was obtained in substantially the same manner as Manufacturing Example 1-1 except that the resulting green body was kept in the air atmosphere (oxygen concentration: about 20% by volume) at a temperature of 1650° C. for 6 hours in a sintering furnace (manufactured by ADVANTEC Group) to perform primary sintering.

Measurement of Relative Density of First Sintered Body

The relative density of the first sintered body in each of Manufacturing Example 1-1 to Manufacturing Example 5-3, and Manufacturing Example 6 was measured. Table 2 shows the results.

The relative density was calculated using Equation (1) below.

The relative density (%)=(the apparent density of the first sintered body÷the true density of the first sintered body)×100     (1)

The true density of the first sintered body was calculated using Equation (2) below. The calculation was carried out supposing the true density of the α-alumina particles used in the examples and comparative examples to be 3.98 g/cm³ and the true density of each YAG phosphor to be 4.60 g/cm³. Table 2 shows the true density of the first sintered body in each manufacturing example.

The true density of the first sintered body=(the mass ratio of the YAG phosphor to the total amount of the YAG phosphor and the alumina particles×the true density of the YAG phosphor)+(the mass ratio of the alumina particles to the total amount of the YAG phosphor and the alumina particles×the true density of the alumina particles)     (2)

The apparent density of the first sintered body was calculated using Equation (3) below.

The apparent density of the first sintered body=the mass of the first sintered body÷the volume of the first sintered body calculated by the Archimedes' method     (3)

Measurement of Alumina Purity

After measuring the mass of the alumina particles, each type of alumina particles was sintered at 800° C. for 1 hour in the air atmosphere to remove the organic content adhering to the alumina particles and water absorbed by the alumina particles. The mass of the sintered alumina particles was measured, and the mass of the sintered alumina particles was divided by the mass of the unsintered alumina particles to calculate the alumina purity using Equation (6) below. Table 2 shows the alumina purity of each type of alumina particles.

The alumina purity (% by mass)=(the mass of sintered alumina particles÷the mass of unsintered alumina particles)×100     (6)

TABLE 2

| | Alumina purity (% by mass) | Average particle size (μm) | Relative density of first sintered body (%) Temperature in primary sintering | | | |
|---|---|---|---|---|---|---|
| | | | 1650° C. | 1700° C. | 1750° C. | 1780° C. |
| Manufacturing Example 6 | 99.5 | 0.40 | 96.1 | — | — | — |
| Manufacturing Example 1-1 | | 0.40 | — | 96.5 | — | — |
| Manufacturing Example 1-2 | | 0.40 | — | — | 96.9 | — |
| Manufacturing Example 1-3 | | 0.40 | — | — | — | 96.7 |
| Manufacturing Example 2-1 | 99.6 | 0.46 | — | 95.9 | — | — |
| Manufacturing Example 2-2 | | 0.46 | — | — | 97.0 | — |
| Manufacturing Example 2-3 | | 0.46 | — | — | — | 97.0 |
| Manufacturing Example 3-1 | 99.9 | 1.00 | — | 96.4 | — | — |
| Manufacturing Example 3-2 | | 1.00 | — | — | 97.0 | — |
| Manufacturing Example 3-3 | | 1.00 | — | — | — | 95.0 |
| Manufacturing Example 4-1 | 99.8 | 1.30 | — | 96.0 | — | — |
| Manufacturing Example 4-2 | | 1.30 | — | — | 96.2 | — |
| Manufacturing Example 4-3 | | 1.30 | — | — | — | 95.1 |
| Manufacturing Example 5-1 | 97.8 | 0.51 | — | 93.1 | — | — |

TABLE 2-continued

|  | Alumina purity (% by mass) | Average particle size (μm) | Relative density of first sintered body (%) Temperature in primary sintering ||||
|---|---|---|---|---|---|---|
|  |  |  | 1650° C. | 1700° C. | 1750° C. | 1780° C. |
| Manufacturing Example 5-2 |  | 0.51 | — | — | 94.3 | — |
| Manufacturing Example 5-3 |  | 0.51 | — | — | — | 94.1 |

As shown in Table 2, alumina particles with an alumina purity of 99.0% by mass or more having an average particle size in a range of 0.2 μm to 1.3 μm can form a first sintered body having a relative density of as high as 95% or more together with YAG phosphor particles. Alumina particles having an average particle size in a range of 0.2 μm to 1.0 μm can form a first sintered body having a higher relative density of 95.9% or more in the case where the temperature in primary sintering is in a range of 1700° C. to 1750° C. In the case where alumina particles with an alumina purity of less than 99.0% by mass was used, the relative density of the first sintered body decreased to less than 95% as shown by Manufacturing Example 5-1 to Manufacturing Example 5-3.

Subsequently, the following describes Examples 21 to 29, 32, 34 to 36, and 37 in which wavelength conversion members were manufactured using the first sintered body obtained in Manufacturing Example 1-1; Comparative Example 31 in which the HIP treatment and annealing were not performed; and Comparative Example 33 in which glass particles were used instead of alumina particles.

Example 21

The first sintered body obtained in Manufacturing Example 1-1 was subjected to the HIP treatment with an HIP device (manufactured by Kobe Steel, Ltd.) using nitrogen gas as the pressure medium in a nitrogen gas atmosphere (nitrogen: 99% by volume or more) at 1700° C. and 198 MPa for 2 hours to provide a second sintered body. The resulting second sintered body was annealed in the air atmosphere (oxygen: about 20% by volume) at 1500° C. for 5 hours with an atmosphere sintering furnace (manufactured by Marusho Denki Co., Ltd.) to provide a wavelength conversion member.

Example 22

A wavelength conversion member was obtained in substantially the same manner as Example 21 except that annealing was performed at 1600° C.

Example 23

A wavelength conversion member was obtained in substantially the same manner as Example 21 except that annealing was performed at 1700° C.

Example 24

A wavelength conversion member was obtained in substantially the same manner as Example 21 except that the HIP treatment was performed at 1740° C. and that annealing was performed at 1600° C.

Example 25

A wavelength conversion member was obtained in substantially the same manner as Example 21 except that the HIP treatment was performed at 1750° C. and that annealing was performed at 1600° C.

Example 26

A wavelength conversion member was obtained in substantially the same manner as Example 21 except that the HIP treatment was performed at 1760° C. and that annealing was performed at 1600° C.

Example 27

A wavelength conversion member was obtained in substantially the same manner as Example 21 except that the HIP treatment was performed at 1770° C. and that annealing was performed at 1600° C.

Example 28

A wavelength conversion member was obtained in substantially the same manner as Example 21 except that the HIP treatment was performed at 1780° C. and that annealing was performed at 1600° C.

Example 29

A wavelength conversion member was obtained in substantially the same manner as Example 21 except that the HIP treatment was performed at 1790° C. and that annealing was performed at 1600° C.

Comparative Example 31

The first sintered body obtained in Manufacturing Example 1-1 was regarded as a wavelength conversion member in Comparative Example 31 without performing the HIP treatment and annealing.

Example 32

The first sintered body obtained in Manufacturing Example 1-1 was subjected to the HIP treatment with an HIP device (product name: manufactured by Kobe Steel, Ltd.) using nitrogen gas as the pressure medium in a nitrogen gas atmosphere (nitrogen: 99% by volume or more) at 1700° C. and 198 MPa for 2 hours to provide a second sintered body. The second sintered body was regarded as a wavelength conversion member in Example 32 without performing annealing.

Comparative Example 33

After weighing 11 parts by mass of a YAG phosphor having an average particle size of 20 μm represented by Y₃Al₅O₁₂:Ce and 89 parts by mass of a borosilicate glass powder (manufactured by Matsunami Glass Ind., Ltd.), the materials were mixed using a dry ball mill. After removing balls used as a mixing medium from the mixed powder, the mixed powder was filled into a mold, and a cylindrical green body having a diameter of 20 mm and a thickness of 20 mm was formed with a pressure of 19.6 MPa (200 kgf/cm²). The resulting green body was put into a packaging container, vacuum-packed, and then subjected to the CIP treatment with a cold hydrostatic isostatic pressing device (manufactured by Kobe Steel, Ltd.) at 176 MPa. The resulting green body was kept in the air atmosphere (oxygen concentration: about 20% by volume) at a temperature of 800° C. for 6 hours in a sintering furnace (manufactured by ADVANTEC Group) to perform primary sintering for the purpose of providing a sintered body, but the product had molten in the sintering furnace and could not be taken out.

Example 34

A wavelength conversion member was obtained in substantially the same manner as Example 21 except that annealing was performed in a reducing atmosphere with an oxygen concentration of less than 1% by volume at 1400° C. for 5 hours.

Example 35

A wavelength conversion member was obtained in substantially the same manner as Example 34 except that annealing was performed at 1500° C.

Example 36

A wavelength conversion member was obtained in substantially the same manner as Example 34 except that annealing was performed at 1600° C.

Example 37

The first sintered body obtained in Manufacturing Example 6 was subjected to the HIP treatment with an HIP device (product name: manufactured by Kobe Steel, Ltd.) using nitrogen gas as the pressure medium in a nitrogen gas atmosphere (nitrogen: 99% by volume or more) at 1650° C. and 198 MPa for 2 hours to provide a second sintered body. The second sintered body was regarded as a wavelength conversion member in Example 37 without performing annealing.

The relative densities, relative emission intensities, and light conversion efficiencies of the wavelength conversion members in Examples 21 to 29, 32, 34 to 36, and 37 and Comparative Example 31 were measured in substantially the same manner as for the wavelength conversion members in Examples 1 to 19 and Comparative Examples 1 to 4.

The true density of each wavelength conversion member is calculated as the sum of a value obtained by multiplying the mass ratio of the alumina particles to the total amount of the YAG phosphor and the α-alumina particles by the true density of the alumina particles, and a value obtained by multiplying the mass ratio of the YAG phosphor particles to the total amount of the YAG phosphor and the α-alumina particles by the true density of the YAG phosphor particles. The calculation was carried out supposing the true density of the α-alumina particles to be 3.98 g/cm³ and the true density of each YAG phosphor to be 4.60 g/cm³.

Supposing the emission intensity at the emission peak wavelength in a wavelength range of 430 nm to 800 nm obtained from a sample of the wavelength conversion member in Comparative Example 31 to be 100%, the emission intensity at the emission peak wavelength in the wavelength range of 430 nm to 800 nm obtained from each sample was represented as a relative emission intensity (%). Table 3 shows the results.

SEM Micrograph

Figure 6:
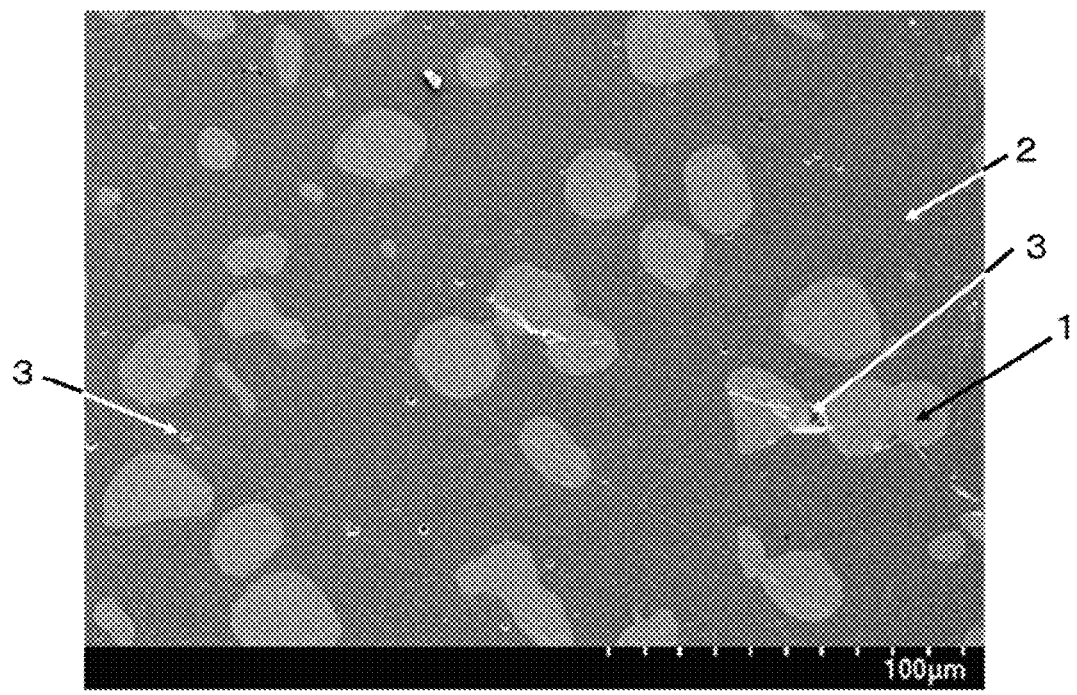
FIG. 6 is a cross-sectional SEM micrograph of a wavelength conversion member according to Example 21.
Figure 7:
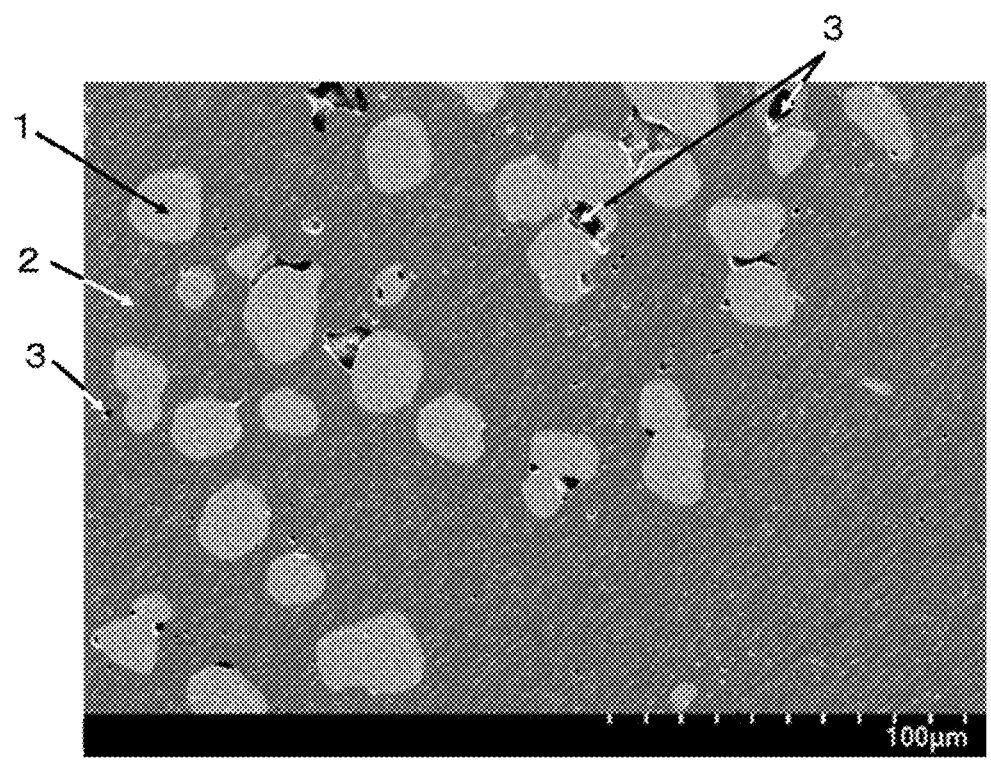
FIG. 7 is a cross-sectional SEM micrograph of a wavelength conversion member according to Comparative Example 31.

Cross-sectional SEM micrographs of the wavelength conversion members in Example 21 and Comparative Example 31 were obtained using a scanning electron microscope (SEM). FIG. 6 is a cross-sectional SEM micrograph of the wavelength conversion member in Example 21. FIG. 7 is a cross-sectional SEM micrograph of the wavelength conversion member in Comparative Example 31.

Photograph of External Appearance

Figure 8:
FIG. 8 is a photograph showing the external appearance of the wavelength conversion member according to Comparative Example 31.
Figure 9:
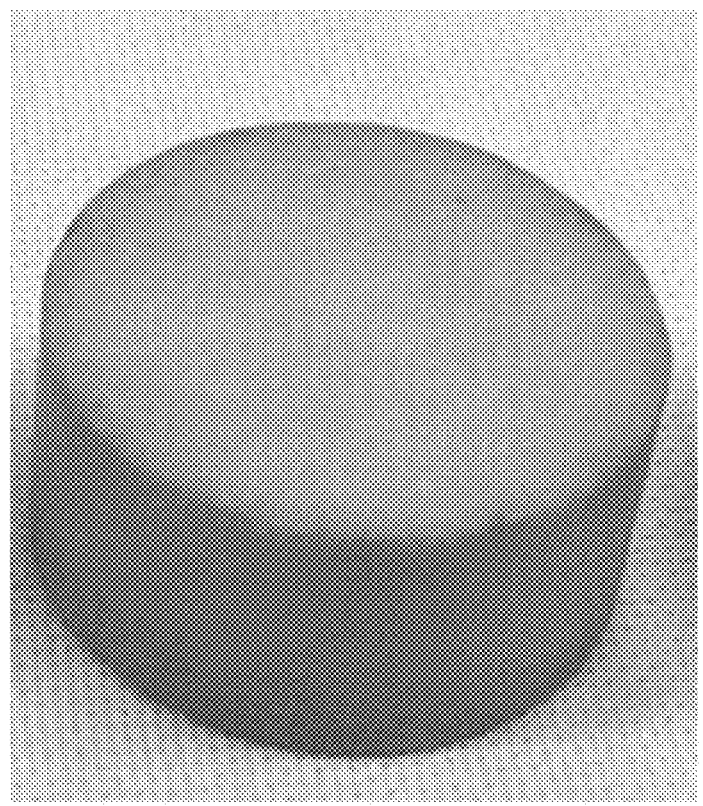
FIG. 9 is a photograph showing the external appearance of a wavelength conversion member according to Example 32.
Figure 10:
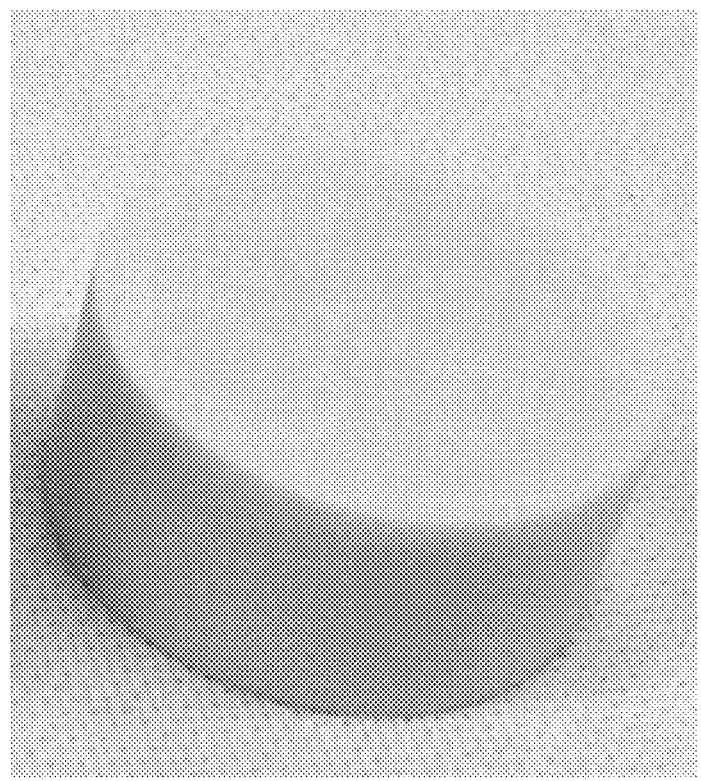
FIG. 10 is a photograph showing the external appearance of the wavelength conversion member according to Example 21.
Figure 11:
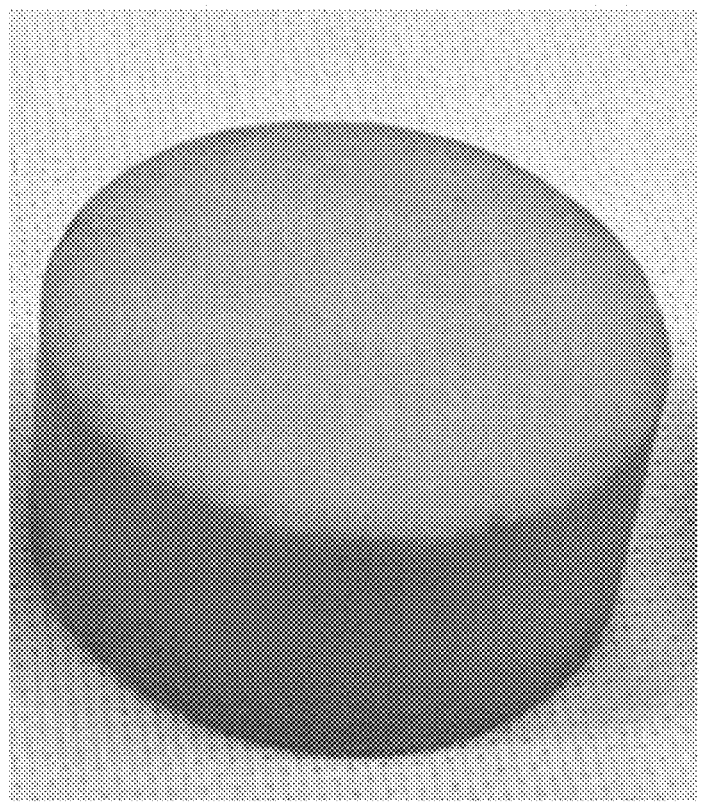
FIG. 11 is a photograph showing the external appearance of a wavelength conversion member according to Example 34.

Photographs showing the external appearances of Comparative Example 31, Example 32, Example 21, and Example 34 were obtained. FIG. 8 is a photograph showing the external appearance of the wavelength conversion member in Comparative Example 31. FIG. 9 is a photograph showing the external appearance of the wavelength conversion member in Example 32. FIG. 10 is a photograph showing the external appearance of the wavelength conversion member in Example 21. FIG. 11 is a photograph showing the external appearance of the wavelength conversion member in Example 34.

TABLE 3

| | Temperature in primary sintering (° C.) | Temperature in secondary sintering (° C.) | Annealing Temperature (° C.) | Annealing Atmosphere | Wavelength conversion member Relative density (%) | Relative emission intensity (%) | Light conversion efficiency (%) |
|---|---|---|---|---|---|---|---|
| Example 21 | 1700 | 1700 | 1500 | Air | 98.3 | 128 | 14.3 |
| Example 22 | 1700 | 1700 | 1600 | Air | 97.6 | 151 | 16.9 |
| Example 23 | 1700 | 1700 | 1700 | Air | 97.6 | 123 | 13.7 |
| Example 24 | 1700 | 1740 | 1600 | Air | 98.7 | 129 | 14.7 |
| Example 25 | 1700 | 1750 | 1600 | Air | 98.3 | 128 | 14.6 |
| Example 26 | 1700 | 1760 | 1600 | Air | 98.6 | 136 | 15.5 |
| Example 27 | 1700 | 1770 | 1600 | Air | 98.3 | 132 | 15.1 |
| Example 28 | 1700 | 1780 | 1600 | Air | 98.5 | 125 | 14.3 |
| Example 29 | 1700 | 1790 | 1600 | Air | 98.2 | 116 | 13.2 |
| Comparative | 1700 | — | — | — | 96.9 | 100 | 11.0 |

TABLE 3-continued

|  | Temperature in primary sintering (° C.) | Temperature in secondary sintering (° C.) | Annealing | | Wavelength conversion member | | |
|---|---|---|---|---|---|---|---|
|  |  |  | Temperature (° C.) | Atmosphere | Relative density (%) | Relative emission intensity (%) | Light conversion efficiency (%) |
| Example 31 |  |  |  |  |  |  |  |
| Example 32 | 1700 | 1700 | — | — | 98.3 | 124 | 13.8 |
| Comparative Example 33 | 800 | — | — | — | Molten (impossible to take out) | | |
| Example 34 | 1700 | 1700 | 1400 | Reducing | 98.3 | 127 | 14.1 |
| Example 35 | 1700 | 1700 | 1500 | Reducing | 98.3 | 127 | 14.2 |
| Example 36 | 1700 | 1700 | 1600 | Reducing | 98.3 | 129 | 14.3 |
| Example 37 | 1650 | 1650 | — | — | 98.0 | 125 | 14.0 |

As shown in Table 3, the wavelength conversion members in Examples 21 to 29, 32, 34 to 36, and 37 exhibited relative densities, relative emission intensities, and light conversion efficiencies higher than the relative density, relative emission intensity, and the light conversion efficiency of the wavelength conversion member in Comparative Example 31. The wavelength conversion members in Examples 32 and 37 obtained through primary sintering at a temperature in a range of 1600° C. to 1780° C. and secondary sintering at a temperature in a range of 1600° C. to 1780° C. exhibited particularly high relative emission intensities and light conversion efficiencies. The wavelength conversion members in Examples 21 to 28 and 34 to 36 obtained through secondary sintering at a temperature in a range of 1700° C. to 1780° C. and annealing at a temperature in a range of 1400° C. to 1700° C. exhibited particularly high relative emission intensities and light conversion efficiencies.

On the other hand, the wavelength conversion member in Comparative Example 31 that had not undergone secondary sintering and annealing exhibited a relative density and light conversion efficiency lower than the relative densities and light conversion efficiencies of the wavelength conversion members in Examples 21 to 29, 32, 34 to 36, and 37.

The external appearance of the wavelength conversion member in Example 32 that had not undergone annealing after secondary sintering involving the HIP treatment had a dark blackish color of the surface on the whole due to secondary sintering involving the HIP treatment but exhibited a relative emission intensity and light conversion efficiency higher than the relative emission intensity and light conversion efficiency of the wavelength conversion member in Comparative Example 31.

In Comparative Example 33, glass melted in primary sintering, and the shape was changed. It was not possible to take a sintered body out of the container, and properties of a sintered body could not be obtained. Also in the case where the HIP treatment was performed at 1800° C., the sintered body melted and could not be taken out of the container.

The external appearances of the wavelength conversion members in Examples 34 to 36 that had undergone secondary sintering involving the HIP treatment followed by annealing in a reducing atmosphere had dark blackish colors of the surfaces on the whole but exhibited relative emission intensities and light conversion efficiencies higher than the relative emission intensity and light conversion efficiency of the wavelength conversion member in Comparative Example 31. The dark blackish colors of the external appearances of the wavelength conversion members in Examples 34 to 36 are attributable to failure of restoration by annealing of the oxygen composition ratio of the YAG phosphor that had been changed by the HIP treatment.

As revealed by the SEM micrograph in FIG. 6, the wavelength conversion member in Example 21, which was obtained by primary sintering of the green body followed by secondary sintering involving the HIP treatment, contained fewer voids 3 between YAG phosphor particles 1 and alumina 2 constituting the matrix of the sintered body and also contained fewer minute voids 3 formed in the alumina 2 constituting the matrix of the sintered body.

As shown in FIG. 6, in the wavelength conversion member in Example 21, the YAG phosphor particles 1 differentiated from the alumina matrix by grain boundaries were present in the alumina 2, which was formed of the alumina particles having molten in the step of secondary sintering to constitute the matrix, and the alumina 2 constituting the matrix and the YAG phosphor particles 1 constituted the ceramic wavelength conversion member in an integrated manner. Since the green body was not provided by mixing raw materials of the YAG phosphor particles with the alumina particles but was provided by mixing the YAG phosphor particles with the alumina particles in the step of providing a green body before primary sintering, the YAG phosphor particles 1 in the wavelength conversion member were differentiated from the alumina 2 constituting the matrix formed of molten and integrated particles by the grain boundaries in the cross-sectional micrograph of the wavelength conversion member. As shown in FIG. 6, in the wavelength conversion member, the alumina 2 constituting the matrix was studded with the YAG phosphor particles 1 retaining shapes of the individual YAG phosphor particles.

On the other hand, as revealed by the SEM micrograph in FIG. 7, the wavelength conversion member in Comparative Example 31 that had not undergone secondary sintering involving the HIP treatment after primary sintering of the green body contained comparatively large voids 3 between the YAG phosphor particles 1 and the alumina 2 constituting the matrix of the sintered body and also contained minute voids 3 in the alumina 2 constituting the matrix of the sintered body.

As shown in FIG. 8, the wavelength conversion member in Comparative Example 31 was the product of primary sintering of the green body, and the first sintered body after primary sintering retained the original light body color of the YAG phosphor on the whole, which revealed that the YAG phosphor particles contained in the first sintered body were not deteriorated by primary sintering.

As shown in FIG. 9, the wavelength conversion member in Example 32 that was the second sintered body obtained by secondary-sintering the first sintered body by applying the HIP treatment had a dark blackish color of the surface on the whole, and the YAG phosphor particles contained in the second sintered body were deteriorated by secondary sintering involving the HIP treatment in some cases.

As shown in FIG. 10, the wavelength conversion member in Example 21 returned to the original body color of the YAG phosphor through annealing in an oxygen-containing atmosphere after secondary sintering involving the HIP treatment, and the wavelength conversion member had a light color on the whole.

As shown in FIG. 11, the wavelength conversion member in Example 34 that had undergone annealing in a reducing atmosphere after secondary sintering involving the HIP treatment retained a dark blackish color on the whole.

As shown in Table 3, the wavelength conversion member in Example 32 described above exhibited a high relative emission intensity and light conversion efficiency on the whole, but part of the wavelength conversion member had a dark blackish color as shown in FIG. 9 in some cases. The wavelength conversion member including such portions is not preferable because the blackish portions absorb light. In the case where the YAG phosphor contained in the second sintered body is deteriorated by secondary sintering involving the HIP treatment to cause part of the second sintered body to have a blackish color as in Example 32, the original body color of the YAG phosphor can be restored as shown in FIG. 10 showing Example 21 by annealing the second sintered body in an oxygen-containing atmosphere.

The wavelength conversion members manufactured by the manufacturing methods in the present disclosure exhibit high emission intensities and high light conversion efficiencies and can be used as wavelength conversion members that convert the wavelengths of light emitted from LEDs and LDs and as solid scintillator materials.

The invention claimed is:

1. A method for manufacturing a wavelength conversion member, the method comprising:
providing by applying a cold isostatic pressing (CIP) treatment a green body comprising:
a yttrium-aluminum-garnet phosphor having a composition represented by Formula (I) below;
alumina particles; and
a powder containing at least $Y_2O_3$;
primary-sintering the green body in an air atmosphere at a temperature in a range of 1200° C. or more and 1800° C. or less to obtain a first sintered body; and
secondary-sintering the first sintered body by applying a hot isostatic pressing (HIP) treatment to obtain a second sintered body, $$(Y_{1-a-b}Gd_aCe_b)_3Al_5O_{12} \quad (I)$$

wherein a and b satisfy $0.01 \leq a \leq 0.3$ and $0.0001 \leq b \leq 0.022$.

2. The method for manufacturing a wavelength conversion member according to claim 1, wherein the green body is pressed by cold hydrostatic isostatic pressing using water as a medium.

3. The method for manufacturing a wavelength conversion member according to claim 1, wherein a pressure in the cold isostatic pressing (CIP) treatment is 50 MPa to 200 MPa.

4. The method for manufacturing a wavelength conversion member according to claim 1, wherein the green body is provided by the cold isostatic pressing (CIP) treatment after press molding.

5. The method for manufacturing a wavelength conversion member according to claim 4, wherein a pressure in press molding is 5 MPa to 50 MPa.

6. The method for manufacturing a wavelength conversion member according to claim 1, wherein the powder further contains at least one selected from the group consisting of LiF, $Nb_2O_5$, and NiO.

7. The method for manufacturing a wavelength conversion member according to claim 6, wherein the total amount of the powder and the alumina particles is in a range of 0.1% by mass or more and 99.9% by mass or less relative to 100% by mass of the powder constituting the green body.

8. The method for manufacturing a wavelength conversion member according to claim 6, wherein a compounding ratio (alumna particles:the powder) between the alumina particles and the powder is 1:99 to 99:1.

9. The method for manufacturing a wavelength conversion member according to claim 1, wherein a and b in Formula (I) satisfy $0.05 \leq a \leq 0.25$ and $0.0002 \leq b \leq 0.012$.

10. The method for manufacturing a wavelength conversion member according to claim 1, the method further comprising:
annealing the second sintered body in an oxygen-containing atmosphere.

11. The method for manufacturing a wavelength conversion member according to claim 1, wherein a temperature in the primary-sintering is in a range of 1600° C. or more and 1780° C. or less.

12. The method for manufacturing a wavelength conversion member according to claim 1, wherein the secondary-sintering is performed in an inert gas atmosphere.

13. The method for manufacturing a wavelength conversion member according to claim 1, wherein a temperature in the secondary-sintering is in a range of 1500° C. or more and 1800° C. or less.

14. The method for manufacturing a wavelength conversion member according to claim 1, the method further comprising:
annealing the second sintered body in an oxygen-containing atmosphere wherein a temperature in the annealing is in a range of 1200° C. or more and 1700° C. or less.

15. The method for manufacturing a wavelength conversion member according to claim 1, wherein the yttrium-aluminum-garnet phosphor has an average particle size in a range of 1 μm to 40 μm.

16. The method for manufacturing a wavelength conversion member according to claim 1, wherein the alumina particles have an average particle size in a range of 0.2 μm to 1.0 μm.

17. The method for manufacturing a wavelength conversion member according to claim 1, wherein the green body is provided by mixing 3% by mass to 50% by mass of the yttrium-aluminum-garnet phosphor and 50% by mass to 97% by mass of the alumina particles relative to a total amount of the yttrium-aluminum-garnet phosphor and the alumina particles.

18. The method for manufacturing a wavelength conversion member according to claim 1, wherein the first sintered body has a relative density of 95% or more.

19. The method for manufacturing a wavelength conversion member according to claim 1, wherein the wavelength conversion member has a relative density of 97% or more.

* * * * *